US012322235B2

(12) United States Patent
Rodd et al.

(10) Patent No.: US 12,322,235 B2
(45) Date of Patent: Jun. 3, 2025

(54) BILL VALIDATOR MOUNT FOR ELECTRONIC GAMING MACHINES

(71) Applicant: Aristocrat Technologies, Inc. (ATI), Las Vegas, NV (US)

(72) Inventors: Donald Rodd, Palm Beach Garden, FL (US); Timothy Barbour, Nolensville, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/656,295

(22) Filed: May 6, 2024

(65) Prior Publication Data

US 2024/0290159 A1 Aug. 29, 2024

Related U.S. Application Data

(63) Continuation of application No. 17/389,076, filed on Jul. 29, 2021, now Pat. No. 11,995,938.

(51) Int. Cl.

*G07D 11/125* (2019.01)
*G07D 11/10* (2019.01)
*G07F 17/32* (2006.01)

(52) U.S. Cl.

CPC ........... *G07D 11/125* (2019.01); *G07D 11/10* (2019.01); *G07F 17/3216* (2013.01); *G07F 17/3246* (2013.01)

(58) Field of Classification Search

CPC ...... G07D 11/125; G07D 11/10; G07D 11/14; G07D 11/40; G07F 17/3216; G07F 17/3246

See application file for complete search history.

(56) References Cited

U.S. PATENT DOCUMENTS

D77,825 S 2/1929 Fey
D139,949 S 1/1945 Haggestrom
(Continued)

FOREIGN PATENT DOCUMENTS

AU 2001051810 A1 12/2001
CA 178255 11/2018
(Continued)

OTHER PUBLICATIONS

Office Action dated Sep. 18, 2020 for U.S. Appl. No. 29/658,892 (pp. 1-5).

(Continued)

*Primary Examiner* — William L Miller

(74) *Attorney, Agent, or Firm* — Weaver Austin Villeneuve & Sampson LLP

(57) ABSTRACT

A bill validator mount holds a bill validator in a bill insertion position relative to an electronic gaming machine (EGM), such that the bill validator is configured to receive a bill from a player in the bill insertion position. The mount cage assembly facilitates tilting the bill validator backward from the bill insertion position to a servicing position that allows access to the bill validator for servicing from a back of the EGM cabinet. The mount cage assembly additionally facilitates lowering the bill validator from the bill insertion position to a collections position, such that the cash box can be accessed for collections. The mount cage assembly provides a way to easily service the bill validator while keeping the cash box secure.

20 Claims, 19 Drawing Sheets

(56) References Cited

U.S. PATENT DOCUMENTS

| | | | |
|---|---|---|---|
| 3,788,333 | A | 1/1974 | Johnson |
| D245,359 | S | 8/1977 | Wilke |
| 4,084,194 | A | 4/1978 | Hector |
| 4,434,931 | A | 3/1984 | Hunt |
| D321,095 | S | 10/1991 | Bockwoldt |
| 5,129,330 | A | 7/1992 | McKay |
| D344,296 | S | 2/1994 | McKay |
| 5,310,152 | A | 5/1994 | O'Neill |
| 5,533,605 | A | 7/1996 | Mays |
| D376,391 | S | 12/1996 | Okumara |
| 5,653,436 | A | 8/1997 | Zouzoulas |
| 5,676,231 | A | 10/1997 | Legras |
| D392,686 | S | 3/1998 | Sarkisian |
| 5,730,271 | A | 3/1998 | Buchman |
| D405,473 | S | 2/1999 | Tikhonski |
| D407,119 | S | 3/1999 | Kwan |
| 5,907,141 | A | 5/1999 | Deaville |
| D411,582 | S | 6/1999 | Muraki |
| 5,993,317 | A | 11/1999 | Majima |
| 5,996,888 | A | 12/1999 | Gromatzky |
| 6,019,207 | A | 2/2000 | Cole |
| D421,631 | S | 3/2000 | Tsuda |
| D434,451 | S | 11/2000 | Grimshaw |
| D452,710 | S | 1/2002 | Ragot |
| D455,789 | S | 4/2002 | Schlueter |
| D460,915 | S | 7/2002 | Lynch |
| 6,416,027 | B1 | 7/2002 | Hart |
| 6,464,586 | B1 | 10/2002 | Kamata |
| D467,977 | S | 12/2002 | Gatto |
| 6,530,842 | B1 | 3/2003 | Wells |
| 6,749,515 | B2 | 6/2004 | Hedrick |
| D501,889 | S | 2/2005 | Harris |
| D509,543 | S | 9/2005 | Hillstrom |
| 6,976,919 | B2 | 12/2005 | Cole |
| 7,044,423 | B2 | 5/2006 | Bober |
| D537,482 | S | 2/2007 | Gadda |
| D544,027 | S | 6/2007 | Nunn |
| 7,267,613 | B2 | 9/2007 | Cole |
| D562,576 | S | 2/2008 | Ritzel |
| D577,075 | S | 9/2008 | Bode |
| 7,533,762 | B2 | 5/2009 | Kuttel |
| D594,068 | S | 6/2009 | Hsu |
| D603,909 | S | 11/2009 | De Viveiros Ortiz |
| 7,832,799 | B2 | 11/2010 | Davis, Jr. |
| 7,891,551 | B2 | 2/2011 | Cha |
| D637,651 | S | 5/2011 | Hase |
| D639,086 | S | 6/2011 | Curbbun |
| 7,971,775 | B2 | 7/2011 | Saltsov |
| 8,012,027 | B2 | 9/2011 | McGahn |
| D647,143 | S | 10/2011 | Yi |
| 8,083,458 | B2 | 12/2011 | Wilkie |
| 8,113,517 | B2 | 2/2012 | Canterbury |
| D658,721 | S | 5/2012 | Yang |
| 8,210,949 | B2 | 7/2012 | Graf |
| 8,356,703 | B2 | 1/2013 | Vysma |
| 8,366,555 | B2 | 2/2013 | McGahn |
| 8,419,550 | B2 | 4/2013 | Anthony |
| 8,444,482 | B2 | 5/2013 | Aoki |
| 8,576,553 | B2 | 11/2013 | Myerchin |
| 8,651,963 | B1 | 2/2014 | Thompson |
| 8,702,497 | B2 | 4/2014 | Chudek |
| D704,273 | S | 5/2014 | Chudek |
| D706,741 | S | 6/2014 | Myers |
| 8,740,188 | B1 | 6/2014 | Foster |
| 8,747,225 | B2 | 6/2014 | Canterbury |
| D708,459 | S | 7/2014 | Heirakuji |
| 8,783,552 | B2 | 7/2014 | Xu |
| 8,858,343 | B2 | 10/2014 | Filipour |
| 8,894,487 | B2 | 11/2014 | Granger |
| D719,615 | S | 12/2014 | Inoue |
| D723,626 | S | 3/2015 | Vasquez |
| 8,986,109 | B2 | 3/2015 | Graf |
| D740,887 | S | 10/2015 | Randazzo |
| D748,729 | S | 2/2016 | Thomaselli |
| 9,721,414 | B2 | 8/2017 | Ledoux |
| 9,756,941 | B1 | 9/2017 | Rowland |
| D802,676 | S | 11/2017 | Steelman |
| D805,047 | S | 12/2017 | Dry |
| D808,467 | S | 1/2018 | Huang |
| 9,858,750 | B2 | 1/2018 | Kovacs |
| D812,145 | S | 3/2018 | Huang |
| D818,048 | S | 5/2018 | Calhoun |
| D820,915 | S | 6/2018 | Lee |
| D824,353 | S | 7/2018 | Won |
| D833,535 | S | 11/2018 | Lim |
| D839,357 | S | 1/2019 | Steelman |
| D842,929 | S | 3/2019 | Hung |
| D843,463 | S | 3/2019 | Castro |
| D843,465 | S | 3/2019 | Castro |
| D843,472 | S | 3/2019 | Castro |
| D843,476 | S | 3/2019 | Lesley |
| D843,479 | S | 3/2019 | Castro |
| D844,062 | S | 3/2019 | Lesley |
| D847,905 | S | 5/2019 | Lewis |
| D848,529 | S | 5/2019 | Lee |
| D849,149 | S | 5/2019 | Bussey |
| 10,287,148 | B2 | 5/2019 | Urban |
| D852,890 | S | 7/2019 | Ross |
| D864,305 | S | 10/2019 | Ortiz De Viveiros |
| 10,445,977 | B2 | 10/2019 | Tovar |
| D866,666 | S | 11/2019 | Ditton |
| D867,461 | S | 11/2019 | Huang |
| D868,716 | S | 12/2019 | Hodgson |
| 10,502,360 | B2 | 12/2019 | Castro |
| 10,515,212 | B1 | 12/2019 | McClintock |
| 10,573,118 | B2 | 2/2020 | Goldstein |
| D883,278 | S | 5/2020 | Yepez |
| D887,496 | S | 6/2020 | Urban |
| D889,546 | S | 7/2020 | Jones |
| D889,547 | S | 7/2020 | Jones |
| D890,848 | S | 7/2020 | Johnson |
| 10,702,772 | B2 | 7/2020 | Achmueller |
| 10,716,224 | B2 | 7/2020 | Dunn |
| D893,630 | S | 8/2020 | Urban |
| 10,810,832 | B2 | 10/2020 | Gallagher |
| 10,825,286 | B2 | 11/2020 | Gallagher |
| D904,098 | S | 12/2020 | Le |
| D905,172 | S | 12/2020 | Zedell, Jr. |
| 10,854,039 | B2 | 12/2020 | Lamb |
| D907,124 | S | 1/2021 | Demarco |
| D907,708 | S | 1/2021 | Demarco |
| D907,709 | S | 1/2021 | Demarco |
| D907,714 | S | 1/2021 | Demarco |
| D908,171 | S | 1/2021 | Demarco |
| D908,173 | S | 1/2021 | Demarco |
| D909,479 | S | 2/2021 | Demarco |
| D909,490 | S | 2/2021 | Demarco |
| D909,491 | S | 2/2021 | Demarco |
| D910,119 | S | 2/2021 | Demarco |
| D910,763 | S | 2/2021 | Demarco |
| D911,055 | S | 2/2021 | Wang |
| 10,922,914 | B2 | 2/2021 | Nireki |
| D911,724 | S | 3/2021 | Waller et al. |
| D911,992 | S | 3/2021 | Stinson |
| D913,379 | S | 3/2021 | Calhoun |
| D915,093 | S | 4/2021 | Shen |
| D915,315 | S | 4/2021 | Ho |
| D917,621 | S | 4/2021 | Kaminkow |
| D918,300 | S | 5/2021 | Demarco |
| D918,303 | S | 5/2021 | Demarco |
| D918,850 | S | 5/2021 | Shim |
| D918,852 | S | 5/2021 | Shim |
| D919,010 | S | 5/2021 | Bussey |
| D919,585 | S | 5/2021 | Shim |
| D919,586 | S | 5/2021 | Lim |
| D920,323 | S | 5/2021 | Lee |
| D920,429 | S | 5/2021 | Hoinowski |
| D921,762 | S | 6/2021 | Hodgson |
| 11,151,833 | B2 | 10/2021 | Hemerick |
| 11,151,834 | B2 | 10/2021 | Urban |
| 11,195,369 | B2 | 12/2021 | Barbour |
| 11,236,855 | B1 | 2/2022 | Lee |
| 11,262,019 | B2 | 3/2022 | Woo |
| D959,557 | S | 8/2022 | Sakai |

(56) References Cited

U.S. PATENT DOCUMENTS

| | | | |
|---|---|---|---|
| D971,323 S | 11/2022 | Hoinowski | |
| D971,324 S | 11/2022 | Park | |
| 11,532,199 B2 | 12/2022 | Urban | |
| D978,246 S | 2/2023 | Turgel | |
| D978,249 S | 2/2023 | Urban | |
| 11,587,389 B2 | 2/2023 | Barbour | |
| 11,744,027 B2 | 8/2023 | Hsu | |
| 2002/0041133 A1 | 4/2002 | Hedrick | |
| 2002/0056960 A1 | 5/2002 | Bergeron | |
| 2002/0066636 A1 | 6/2002 | Saltsov | |
| 2002/0198034 A1 | 12/2002 | Wang | |
| 2003/0064791 A1 | 4/2003 | Hedrick | |
| 2003/0195037 A1 | 10/2003 | Vuong | |
| 2004/0018877 A1 | 1/2004 | Tastad | |
| 2004/0090151 A1 | 5/2004 | Nagano | |
| 2005/0026702 A1* | 2/2005 | Cole | G07F 17/32 463/46 |
| 2005/0109892 A1 | 5/2005 | Bober | |
| 2005/0212656 A1 | 9/2005 | Denison | |
| 2005/0277477 A1 | 12/2005 | Hajder | |
| 2006/0081441 A1 | 4/2006 | Vysma | |
| 2006/0205504 A1 | 9/2006 | Okada | |
| 2006/0287112 A1 | 12/2006 | Mallory | |
| 2007/0000993 A1 | 1/2007 | Graef | |
| 2007/0099708 A1 | 5/2007 | Okada | |
| 2007/0221810 A1 | 9/2007 | Liao | |
| 2008/0055491 A1 | 3/2008 | Gordon | |
| 2008/0087521 A1 | 4/2008 | Cole | |
| 2008/0113740 A1 | 5/2008 | McGahn | |
| 2008/0113768 A1 | 5/2008 | Baerlocher | |
| 2008/0113820 A1 | 5/2008 | Tedsen | |
| 2008/0119289 A1 | 5/2008 | Lind | |
| 2008/0132313 A1 | 6/2008 | Rasmussen | |
| 2008/0254862 A1 | 10/2008 | Mattice | |
| 2008/0254881 A1 | 10/2008 | Lutnick | |
| 2009/0280911 A1 | 11/2009 | Tsao | |
| 2010/0102502 A1 | 4/2010 | Saltsov | |
| 2010/0120530 A1 | 5/2010 | Lesley | |
| 2010/0289208 A1 | 11/2010 | Clauser | |
| 2011/0011699 A1 | 1/2011 | Shuren | |
| 2011/0094850 A1 | 4/2011 | Seki | |
| 2011/0266937 A1 | 11/2011 | Roberts | |
| 2011/0269552 A1 | 11/2011 | Haga | |
| 2013/0035159 A1 | 2/2013 | Cornell | |
| 2013/0180821 A1 | 7/2013 | Clauser | |
| 2013/0279090 A1 | 10/2013 | Brandt | |
| 2015/0048230 A1 | 2/2015 | Satterfield | |
| 2015/0211675 A1 | 7/2015 | Shyu | |
| 2015/0336491 A1 | 11/2015 | Abe | |
| 2016/0125681 A1 | 5/2016 | Ledoux | |
| 2016/0335836 A1 | 11/2016 | Castro | |
| 2017/0039812 A1 | 2/2017 | Baron | |
| 2017/0169663 A1 | 6/2017 | Froy | |
| 2017/0294072 A1 | 10/2017 | Achmüller | |
| 2018/0053373 A1 | 2/2018 | Goldstein | |
| 2018/0075707 A1 | 3/2018 | Hirai | |
| 2018/0082523 A1 | 3/2018 | Palermo | |
| 2018/0190068 A1 | 7/2018 | Priddy | |
| 2019/0012874 A1 | 1/2019 | Goldstein | |
| 2019/0046872 A1 | 2/2019 | Glenn, II | |
| 2019/0080547 A1 | 3/2019 | Urban | |
| 2019/0096161 A1 | 3/2019 | Barbour | |
| 2019/0096169 A1 | 3/2019 | Tovar | |
| 2019/0096170 A1 | 3/2019 | Lewis | |
| 2019/0096173 A1 | 3/2019 | Brandau | |
| 2019/0096174 A1 | 3/2019 | Ambrecht | |
| 2019/0099000 A1 | 4/2019 | Waller | |
| 2019/0102982 A1 | 4/2019 | Barbour | |
| 2019/0254433 A1 | 8/2019 | Smit | |
| 2019/0317549 A1 | 10/2019 | Gurr | |
| 2019/0321717 A1 | 10/2019 | Rynda | |
| 2019/0333309 A1* | 10/2019 | Bullock | G07D 11/13 |
| 2020/0090455 A1 | 3/2020 | Ambrecht | |
| 2020/0312088 A1 | 10/2020 | Penacho | |
| 2020/0378481 A1 | 12/2020 | Laurent | |
| 2021/0247018 A1 | 8/2021 | Yamada | |
| 2021/0350656 A1 | 11/2021 | Barbour | |
| 2022/0101685 A1 | 3/2022 | Rodriguez | |
| 2022/0148374 A1 | 5/2022 | Penacho | |
| 2022/0301384 A1 | 9/2022 | Rodriguez | |
| 2022/0339792 A1 | 10/2022 | Wang | |
| 2023/0026251 A1 | 1/2023 | Tracy | |
| 2023/0045373 A1 | 2/2023 | Rodd | |
| 2023/0111030 A1 | 4/2023 | McClintock | |
| 2023/0121737 A1 | 4/2023 | Winston | |
| 2024/0395096 A1* | 11/2024 | Bhagat | G07D 11/18 |

FOREIGN PATENT DOCUMENTS

| | | |
|---|---|---|
| DE | 0015402120001 | 6/2009 |
| DE | 0015402380001 | 8/2009 |
| DE | 0028613360001 | 11/2015 |
| EP | 1778375 | 5/2007 |
| JP | 1101243 | 2/2001 |
| JP | 2002263262 A | 9/2002 |
| JP | 1484230 | 10/2013 |
| WO | 2005094957 A1 | 10/2005 |

OTHER PUBLICATIONS

Notice of Allowance dated Dec. 31, 2020 for U.S. Appl. No. 29/658,892 (pp. 1-5).

Office Action dated Apr. 29, 2021 for U.S. Appl. No. 16/867,290 (pp. 1-12).

Notice of Allowance dated Jul. 8, 2021 for US App. No. 29/768, 121 (pp. 1-10).

Notice of Allowance dated Aug. 5, 2021 for U.S. Appl. No. 16/867,290 (pp. 1-7).

Notice of Allowance dated Nov. 1, 2021 for U.S. Appl. No. 16/867,290 (pp. 1-7).

Office Action dated Jan. 7, 2022 for U.S. Appl. No. 29/696,682 (pp. 1-8).

Flappy Bird arcade cabinet will empty your wallet in record time, Fingas, Jan. 10, 2015, retrieved from https://www.engadget.com/2015/01/10/flappy-bird-arcade-cabinet/.

World's Largest Pac-Man Game Overview, Bandai Namco, Jul. 11, 2016, retrieved from https://www.youtube.com/watch?time_continue=54&v=4GqS9TTecGc.

ICE Debuts Shell Game Addition to Price Is Right Redemption Lineup, Montano, Jun. 5, 2011, retrieved from https://www.vendingtimes.(X)m/articles/ice-debuts-shell-game-addition-to-price-is-right-r-8412?id=5FF3782D18934396BD83A14B3BD1E0BC.

SD Ped pro, Xtension, Sep. 28, 2014, retrieved from http://www.xtensiongaming.com/products/xtension-sit-down-pedestal-arcade-cabineet-for-fight-sticks/attachment/sd-ped-pro/.

Incredible Technologies Details Golden Tee LIVE 2012, ARCADEHERO, Aug. 25, 2011, retrieved from http://arcadeheroes.com/2011/08/25/incredible-technologies-details-golden-tee-live-2012/.

NOVOMATIC to showcase latest products at Peru Gaming Show, Jun. 2, 2016, retrieved from http://www.innovategaming.com/c63114.

Introductie Fazi Roulette, Elam Group, Jun. 10, 2018, retrieved from https://www.youtube.com/watch?v=RLrFI5QDT5U.

Office Action dated Apr. 18, 2022 for U.S. Appl. No. 29/696,682 (pp. 1-6).

Office Action (Non-Final Rejection) dated Jun. 22, 2022 for U.S. Appl. No. 17/384,199 (pp. 1-9).

Office Action dated Aug. 4, 2022 for U.S. Appl. No. 29/708,718 (pp. 1-5).

Office Action dated Aug. 4. 2022 for U.S. Appl. No. 29/716,520 (pp. 1-6).

Notice of Allowance dated Oct. 26, 2022 for U.S. Appl. No. 29/696,682 (pp. 1-5).

Office Action (Notice of Allowance and Fees Due (PTOL-85)) dated Dec. 7, 2022 for U.S. Appl. No. 17/384,199 (pp. 1-7).

Notice of Allowance dated Jan. 13, 2023 for U.S. Appl. No. 29/708,718 (pp. 1-7).

(56) References Cited

OTHER PUBLICATIONS

Office Action dated Mar. 25, 2020, for U.S. Appl. No. 29/658,892 (pp. 1-10).
Office Action (Non-Final Rejection) dated Jul. 26, 2023 for U.S. Appl. No. 17/529,102 (pp. 1-6).
Office Action (Notice of Allowance and Fees Due (PTOL-85)) dated Aug. 4, 2023 for U.S. Appl. No. 17/865,016 (pp. 1-7).
Office Action dated Aug. 9, 2023 for U.S. Appl. No. 29/775,222 (pp. 1-10).
Office Action (Non-Final Rejection) dated Sep. 8, 2023 for U.S. Appl. No. 17/389,076 (pp. 1-5).
Office Action dated Oct. 17, 2023 for U.S. Appl. No. 18/168,361 (pp. 1-9).
Office Action (Non-Final Rejection) dated Oct. 17, 2023 for U.S. Appl. No. 18/168,361 (pp. 1-8).
Office Action (Notice of Allowance and Fees Due (PTOL-85)) dated Nov. 16, 2023 for U.S. Appl. No. 17/529,102 (pp. 1-5).
Office Action (Notice of Allowance and Fees Due (PTOL-85)) dated Dec. 28, 2023 for U.S. Appl. No. 17/384,323 (pp. 1-10).
Office Action (Notice of Allowance and Fees Due (PTOL-85)) dated Jan. 31, 2024 for U.S. Appl. No. 17/529,102 (pp. 1-5).
Office Action (Notice of Allowance and Fees Due (PTOL-85)) dated Feb. 22, 2024 for U.S. Appl. No. 17/389,076 (pp. 1-8).
Office Action (Non-Final Rejection) dated Mar. 14, 2024 for U.S. Appl. No. 17/384,318 (pp. 1-15).
Office Action dated Mar. 27, 2024 for U.S. Appl. No. 18/168,361 (pp. 1-13).
Office Action (Final Rejection) dated Jun. 18, 2024 for U.S. Appl. No. 17/384,318 (pp. 1-16).
Office Action (Notice of Allowance and Fees Due (PTOL-85)) dated Aug. 7, 2024 for U.S. Appl. No. 18/168,361 (pp. 1-8).
Office Action (Notice of Allowance and Fees Due (PTOL-85)) dated Sep. 11, 2024 for U.S. Appl. No. 17/384,318 (pp. 1-8).
Office Action (Notice of Allowance and Fees Due (PTOL-85)) dated Oct. 9, 2024 for US App. No. (pp. 1-7).

* cited by examiner

BILL VALIDATOR MOUNT FOR ELECTRONIC GAMING MACHINES

RELATED APPLICATIONS

The present application is a continuation of and claims priority to U.S. patent application Ser. No. 17/389,076, filed Jul. 29, 2021, and entitled "Bill Validator Mount for Electronic Gaming Machines" which is hereby incorporated by reference in its entirety.

The present application is related to U.S. patent application Ser. No. 16/857,290 filed May 5, 2020, U.S. patent application Ser. No. 29/658,892 filed Aug. 3, 2018, and U.S. patent application Ser. No. 29/696,682 filed Jun. 28, 2019, the disclosures of which are hereby incorporated by reference in their entirety.

BACKGROUND

Electronic gaming machines ("EGMs"), or gaming devices, provide a variety of wagering games such as slot games, video poker games, video blackjack games, roulette games, video bingo games, keno games and other types of games that are frequently offered at casinos and other locations. Play on EGMs typically involves a player establishing a credit balance which may be accomplished by inputting a bill, such as money or another form of monetary credit (e.g., a credit ticket in a ticket-in ticket-out system) into a bill validator of the EGM. The bill validator receives the bill and stores or arranges the bills in a cash box. The bill validator needs to be accessible for servicing (e.g., to address a bill jam) as well as for collection (removing or replacing the cash box). However, it is also important that the bill validator be secured from unwanted access given that it is not uncommon for the cash boxes to store significant amounts of money. Some conventional bill validators are difficult to access for collection, are difficult to access for servicing, are not sufficiently secure, do not work well with a pedestal cabinet, etc.

SUMMARY

Embodiments provide a bill validator mount that allows the bill validator to move from an bill insertion position for accepting bills from a player to a collections position for accessing the cash box, and from the bill insertion position to a servicing position for accessing jams or other servicing which does not require access to the cash box. In at least one example, the bill validator mount allows the bill validator to drop lower from the bill insertion position to the collections position and tilts backward from the bill insertion position to the servicing position. In some examples, the bill validator mount does not allow access to the cash box in the servicing position.

An embodiment provides a bill validator mount including a support bracket and a mount cage assembly. The support bracket is configured to be coupled to a bill validator and the mount cage assembly is configured to receive the support bracket, the bill validator, and a cash box. The mount cage assembly is also configured to hold the bill validator in a bill insertion position relative to an electronic gaming machine (EGM), such that the bill validator is configured to receive a bill from a player in the bill insertion position. The mount cage assembly is further configured to tilt the bill validator backward from the bill insertion position to a servicing position that allows access to the bill validator for servicing.

Another embodiment provides an electronic gaming machine (EGM) including a cabinet, a player input interface positioned on the cabinet, and a bill validator assembly positioned in the cabinet. The bill validator assembly includes a bill validator configured to receive a bill from a player, a cash box configured to store the bill, and a bill validator mount holding the bill validator and the cash box. The bill validatory mount includes a support bracket coupled to the bill validator, and a mount cage assembly coupled to the support bracket and configured to position the bill validator to receive the bill from the player in a bill insertion position. The mount cage assembly is configured to facilitate movement of the bill validator in a first direction from the bill insertion position to a servicing position. The mount cage assembly is also configured to facilitate movement of the bill validator in a second direction from the bill insertion position to a collections position, with the first direction being different than the second direction.

Another embodiment provides a method which includes providing or obtaining a bill validator mount positioned in an electronic gaming machine (EGM), such that a bill validator coupled to the bill validator mount is in a bill insertion position for receiving a bill from a player and a cash box is housed by the bill validator mount within a cabinet of the EGM. The method further includes accessing a handle associated with a cam cage assembly of the bill validator mount from a front side of the cabinet and pulling the handle to move the bill validator from the bill insertion position to a collections position to provide access to a door lock assembly securing the cash box. The method additionally includes accessing the bill validator from a back side of the cabinet and pulling the bill validator toward a back of the cabinet to move the bill validator from the bill insertion position to a servicing position.

DETAILED DESCRIPTION

The present disclosure is generally directed to providing a bill validator mount that allows the bill validator to be positioned in a bill insertion position for receiving a bill (e.g., money or ticket) from a player, and moved from the bill insertion position to a collections position and from the bill insertion position to a servicing position. The bill validator mount allows the bill validator to be lowered from the bill insertion position to the collections position to allow easy access to the cash box for collections, such as removing or replacing the cash box. The bill validator mount allows the bill validator to be tilted backward from the bill insertion position to the servicing position to allow easy access for servicing the bill validator, such as removing a bill jam, removing the bill validator, or the like. Generally, the bill validator mount secures the cashbox while allowing access to the bill validator for servicing and only allows for removal of the bill validator or access to the cash box when a door locking assembly has been unlocked, for example with a key provided to those with cash box credentials (credentials to access the cash box for collections or otherwise). As such, the bill validator mount of the present disclosure allows access to the bill validator for servicing by technicians or other personnel that do not have cash box credentials (though they may still be required to be credentialed operators such as service operations, service technicians, or other support personnel to get access to the cabinet). As such, a person with cash box credentials is not required for a bill validator servicing operation since the cash box will be kept secure and not accessible. Further, the different location for the collections position relative to the servicing position facilitates easy access and operation for each of servicing and collections.

The bill validator for an EGM must contain a secure tamper resistant container known as a cash box. Currency, gaming vouchers, and coupons inserted into the bill validator are deposited into the cash box until they are retrieved by casino personnel. For example, casino personnel often perform a cash drop (remove currency, gaming vouchers, and coupons from the cash box) at hours when the machines are not busy (for example, at night). The disclosed bill validator mount allows for an easy, quick, and secure cash drop, which is beneficial for the purposes of efficiency, security, and safety. Further, the disclosed bill validator mount allows for access to the cash box for a cash drop without disturbing other components of the EGM, such as the display or the user interface.

Figure 1:
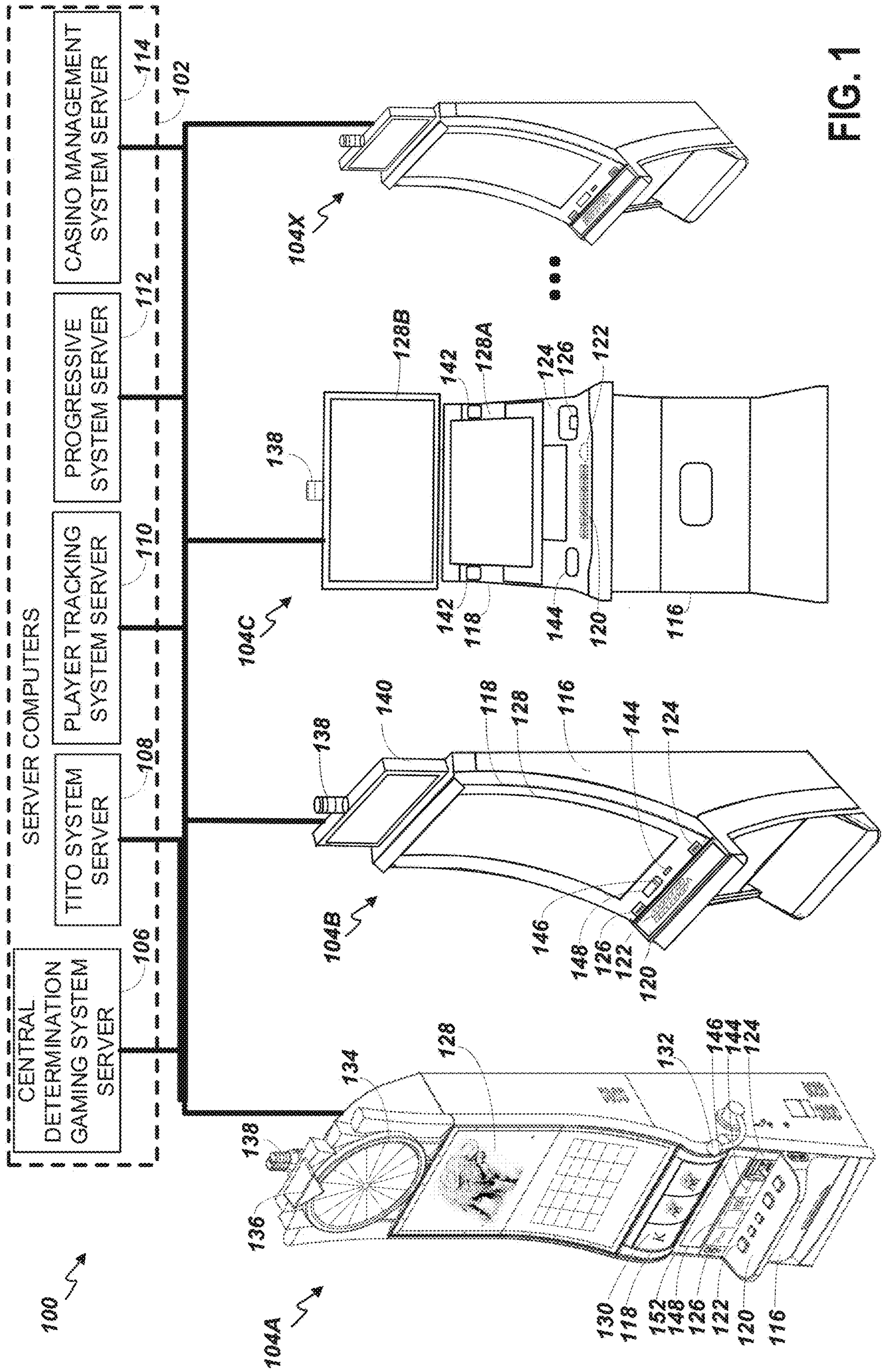
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In some examples, the buttons 122 in the button deck 120 can be physical buttons, or other player-actuatable selection elements, such as switches, dials, knobs, and the like. In further examples, the button deck 120 can be a virtual button deck and can be, or include, a display, such as a capacitive touchscreen. The buttons 122 can be virtual buttons, or other selection elements, that can be actuated through suitable player interaction (e.g., by performing pressing, swiping, dragging, or similar actions on the display of the virtual button deck 120). The virtual button deck can include a combination of pushbuttons and virtual buttons. Suitable virtual button decks 120 include the virtual button deck included in the Helix XT™ model gaming device manufactured by Aristocrat® Technologies, Inc. Although described with respect to the gaming device 104A, the button decks 120 of one or both of gaming devices 104B or 104C can be virtual button decks having virtual buttons 122 and/or push-buttons 122.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), win paths (e.g. paylines), pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
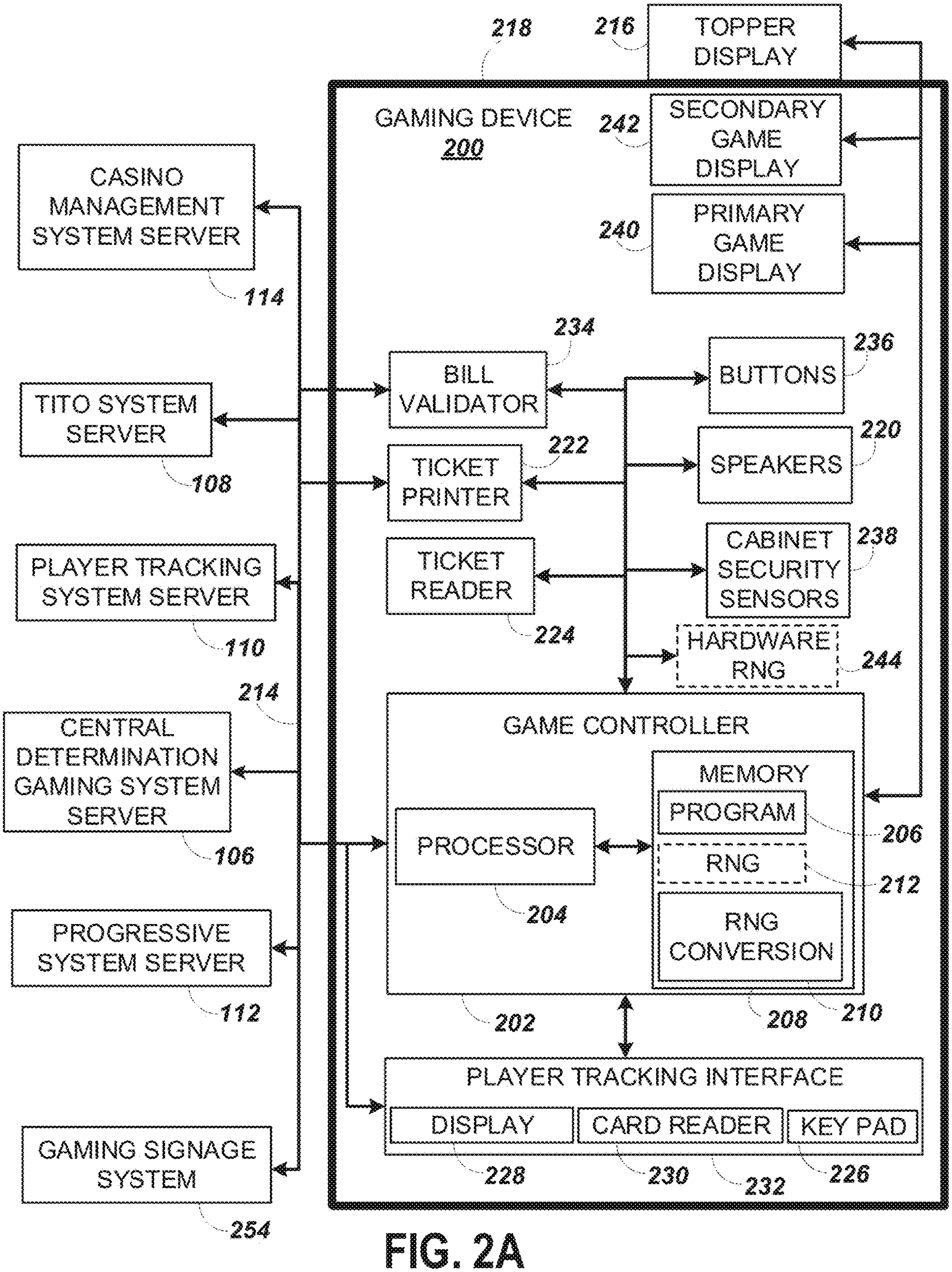
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility. A weighted table is one type of lookup table and the two terms can be used interchangeably throughout the present disclosure.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., for a random number RND, generated by an RNG, in the range of 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

| Example Weighted Table Count Value | Entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and predetermined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

Figure 2B:
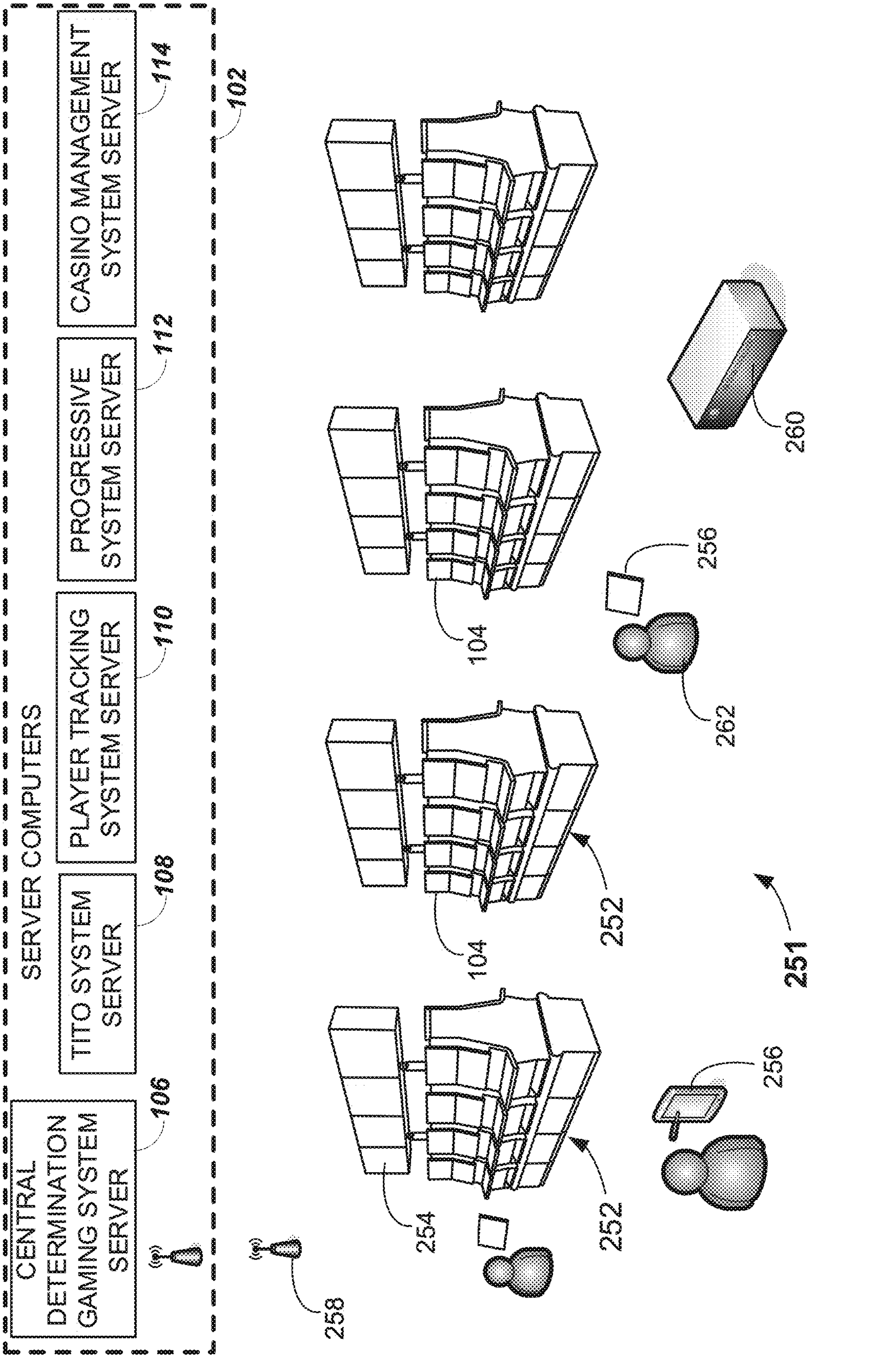
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button, a virtual button (e.g., a button provided via a graphical user interface on a virtual button deck), or a dynamic pushbutton in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
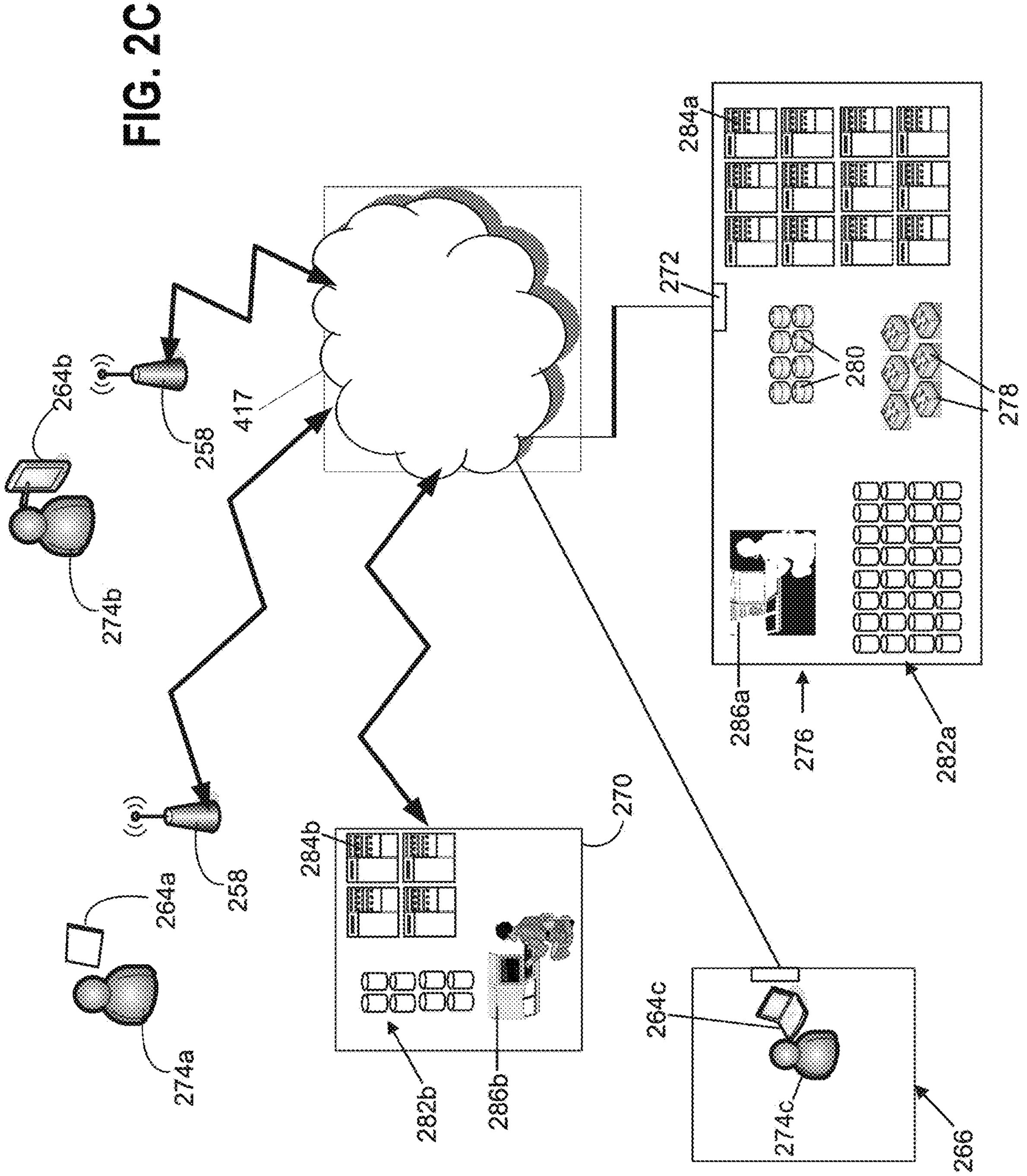
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264 *a*, 264 *b* and 264 *c* are capable of communication via one or more networks 417. The networks 417 may, for example, include one or more cellular telephone networks, the Internet, etc. In this example, the EUDs 264 *a* and 264 *b* are mobile devices: according to this example the EUD 264 *a* is a tablet device and the EUD 264 *b* is a smart phone. In this implementation, the EUD 264 *c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282 *a*, servers 284 *a* and one or more workstations 570 *a*. The servers 284 *a* may, for example, be configured to provide access to a library of games for online game play. In some examples, code for executing at least some of the games may initially be stored on one or more of the storage devices 282 *a*. The code may be subsequently loaded onto a server 284 *a* after selection by a player via an EUD and communication of that selection from the EUD via the networks 417. The server 284 *a* onto which code for the selected game has been loaded may provide the game according to selections made by a player and indicated via the player's EUD. In other examples, code for executing at least some of the games may initially be stored on one or more of the servers 284 *a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284 *b*, storage devices 282 *b*, and one or more workstations 286 *b*. According to this example, the financial institution data center 270 is configured to maintain financial accounts, such as checking accounts, savings accounts, loan accounts, etc. In some implementations one or more of the authorized users 274 *a*-274 *c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284 *a* may be configured to monitor player credit balances, which may be expressed in game credits, in currency units, or in any other appropriate manner. In some implementations, the server(s) 284 *a* may be configured to obtain financial credits from and/or provide financial credits to one or more financial institutions, according to a player's "cash in" selections, wagering game results and a player's "cash out" instructions. According to some such implementations, the server(s) 284 *a* may be configured to electronically credit or debit the account of a player that is maintained by a financial institution, e.g., an account that is maintained via the financial institution data center 270. The server(s) 284 *a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274 *a*-274 *c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
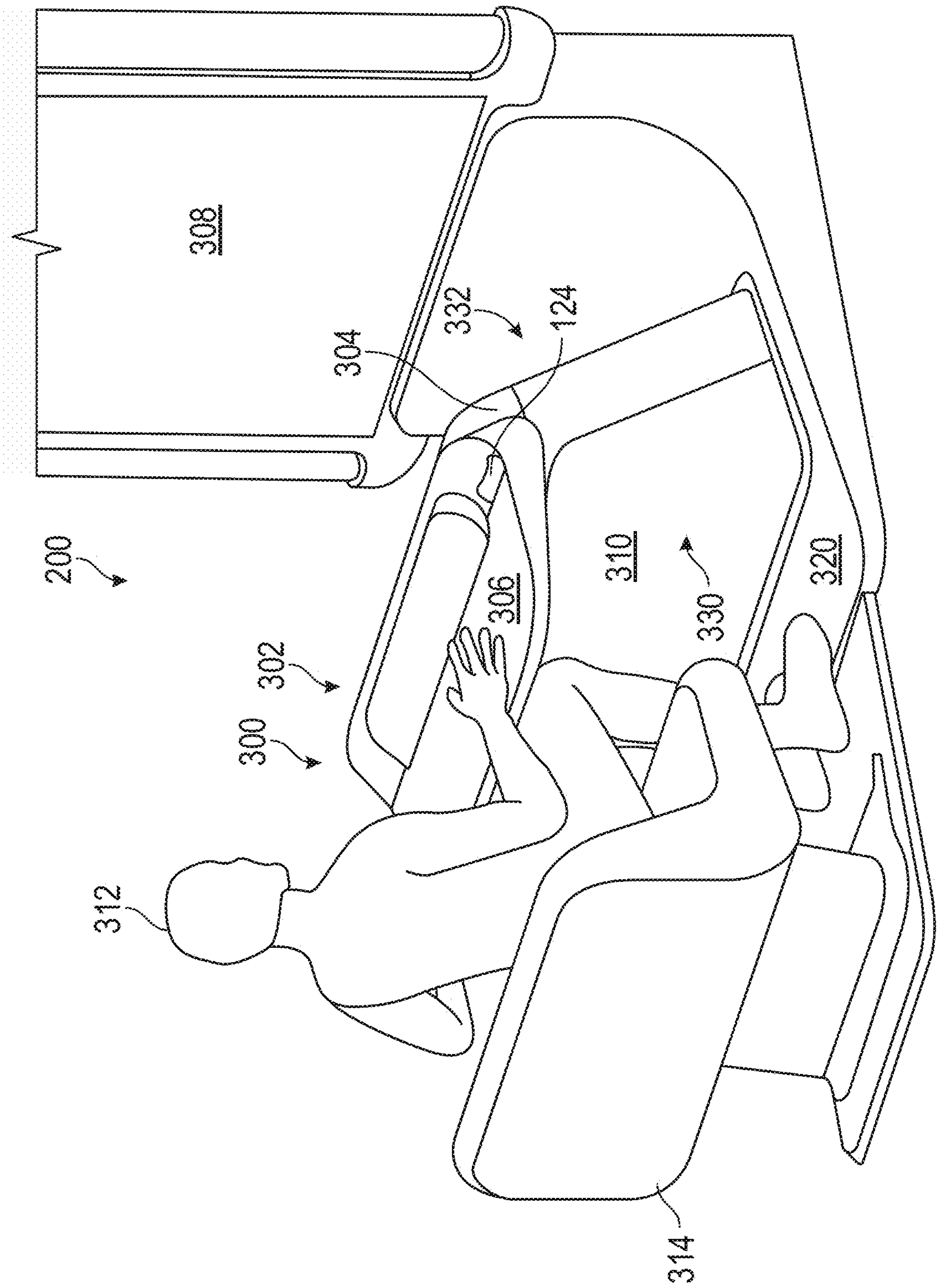
FIG. 3 is an exemplary diagram showing a pedestal EGM, in accordance with at least one embodiment.
Figure 4:
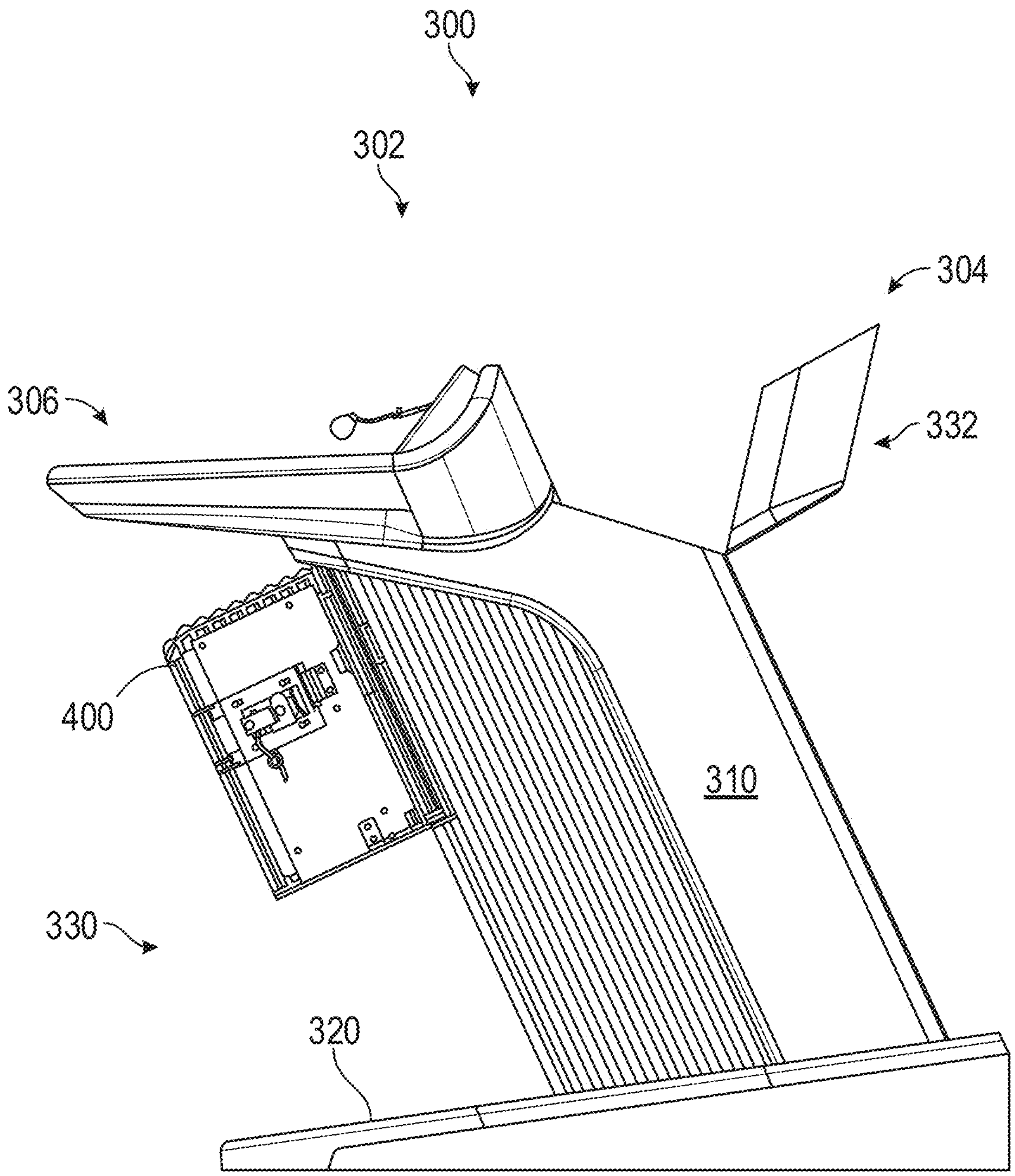
FIG. 4. is an exemplary diagram showing a perspective view of the pedestal system of FIG. 3 in an open position, in accordance with at least one embodiment.

FIGS. 3 and 4 are exemplary diagrams showing a pedestal system 300 including a pedestal 302 and display 308. In at least one example, the pedestal system 300 is a Cinema™ model gaming device manufactured by Aristocrat® Technologies, Inc. In the illustrated example, the pedestal system 300 is an electronic gaming machine such as the gaming devices 104 and 200 (see FIGS. 1 and 2). The display device 308 may display an electronic game (e.g., during game play). The pedestal 302 is set apart from the display 308 and serves as a cabinet for various gaming device components. In some examples, the pedestal 302 includes an access door 304, allowing access to an interior portion of the cabinet and the various components thereof. In some examples, the pedestal 302 also includes a player input interface 306 which is used by a player 312 to play an electronic game. In some examples, the player input interface 306 may be similar to or include the button deck 120. The player input interface 306 may include buttons 122, 236 (e.g., in a button panel), a touchscreen, and/or virtual buttons.

In the illustrated example, the access door 304 is rotatably coupled to a base 310 of pedestal 302, for example, by a limited torque hinge, or the like. In some examples, the base 310 may be coupled to or include a footrest 320 such that a front side 330 of the footrest 320 and the base 310 are positioned at an acute angle relative to each other. In some embodiments, the footrest 320 and the base 310 may be positioned at or near ninety degrees relative to each other so that the base 310 is in a more upright position. During gameplay, the player 312 seated in a chair 314 interacts with the player input interface 306 in order to operate the electronic game. In some examples, pedestal 302 may be a standalone cabinet with no chair 313 such that the player 312 can operate gaming device 200 while standing up. In some examples, the chair 314 is wider than shown in FIG. 3 such that more than one player 312 can be seated during gameplay. In some examples, the button deck 306 may be configured to include more than one set of buttons 122 such that multiple players 312 can play the electronic game.

In the illustrated example, the pedestal 302 is positioned with a gap between the pedestal 302 and the display device 308, such that a credentialed operator or technician can more easily access the display device 308 or a back 332 of the pedestal 302. In other examples, the display device 308 may be closer or farther away from the pedestal 302. In some examples, the display device 308 may be attached to a wall or hung from the ceiling. In some examples, the display device 308 may be coupled to the pedestal 302. In various examples, the display 308 may be straight/flat, the display 308 may be curved, the display 308 may be formed into other shapes (e.g., a curved portrait display or landscape display), a combination of these, or the like.

In some examples, the pedestal system 300 provides for restricted access to an interior portion of the pedestal 302 by way of the access door 304 and a panel or a portion of a panel 400 at the front side 330 of the base 310. The panel or the portion of a panel 400 may open or removed to allow access to one or more interior components. In at least one example, the panel 400 comprises a door that is hinged on a side, top, or bottom to allow access to the interior of the pedestal 302. In some examples, the panel 400 is positioned below the button deck 306 and may be opened or otherwise allow access to the interior of the pedestal 302 without disturbing the button deck 306. The access door 304 may be rotatably coupled to the pedestal 302 such that the access door 304 may rotate between a closed position and an open position. During various service operations, service technicians or other support personnel (e.g., "credentialed operators") may need access to components housed within the pedestal 302. For example, support personnel may refill ticket paper of a ticket printer housed within the pedestal 302, retrieve a cash box, replace malfunctioning components, perform software support or accounting functions (e.g., device resets, memory clears, software installations), a combination of these, or the like.

Figure 5A:
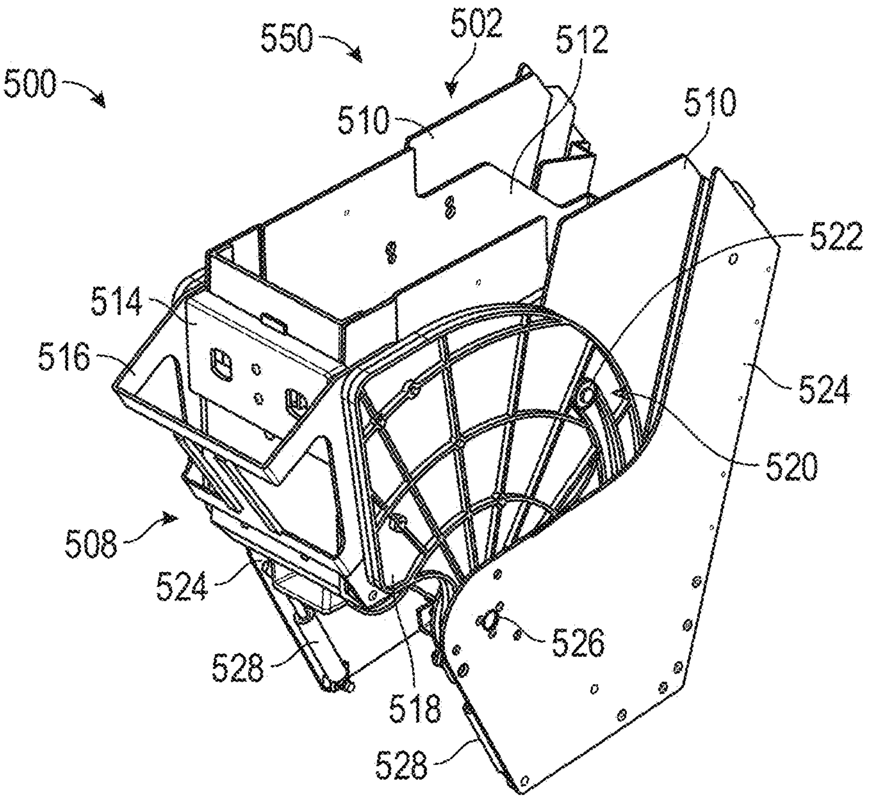
FIG. 5A is an isometric view of a mount cage assembly of a bill validator mount, in accordance with at least one embodiment.
Figure 5B:
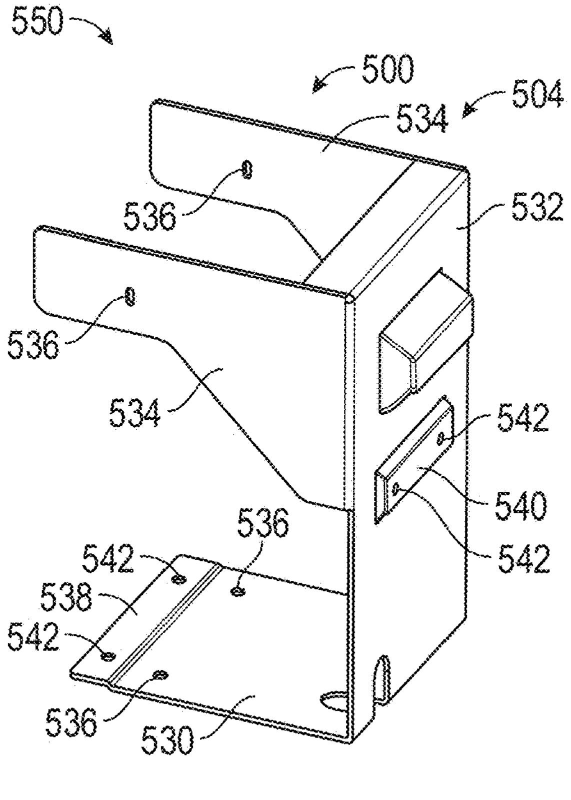
FIG. 5B is an isometric view of a support bracket of a bill validator mount, in accordance with at least one embodiment.
Figure 5C:
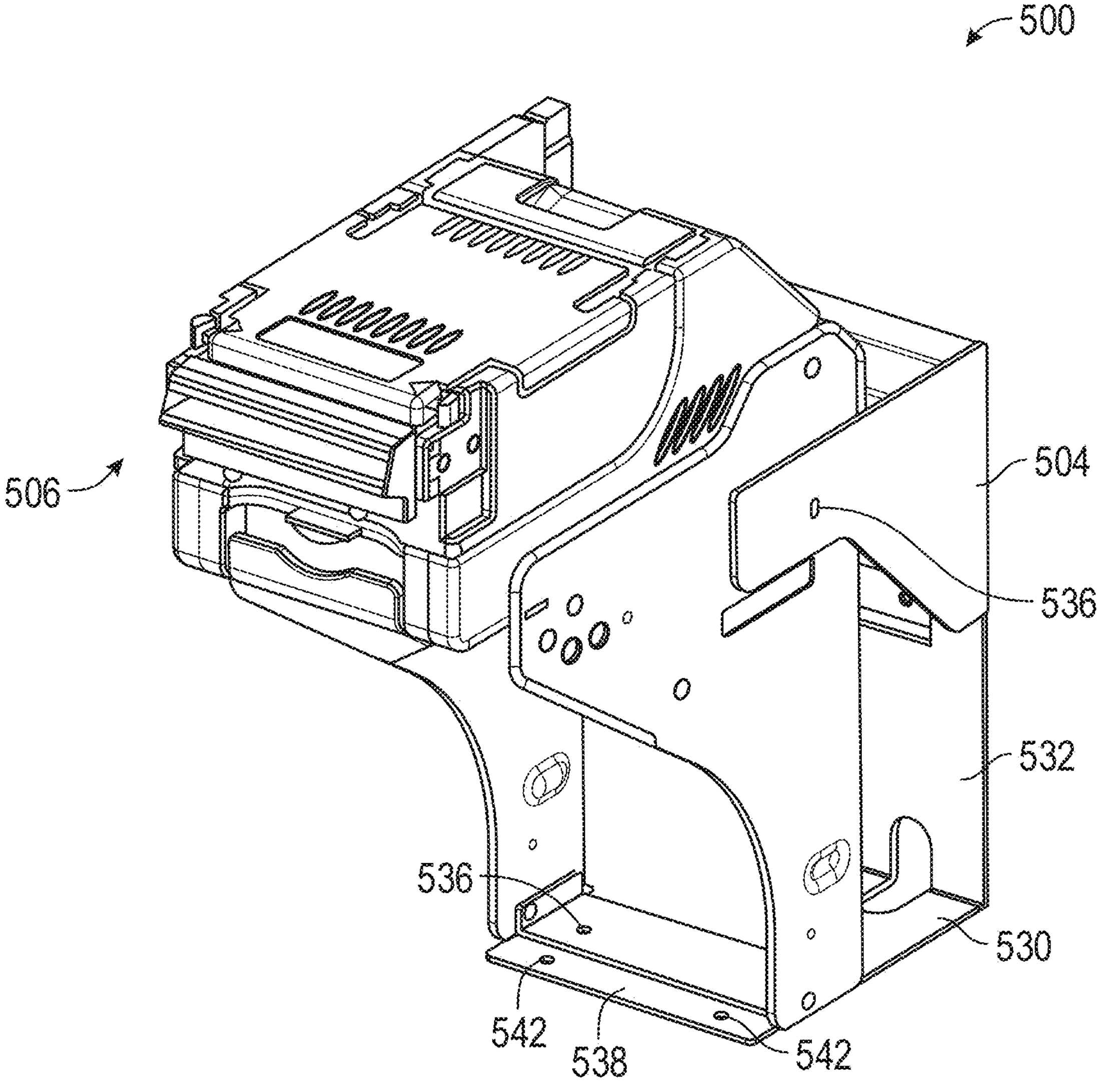
FIG. 5C is an isometric view of the support bracket of FIG. 5B coupled to a bill validator, in accordance with at least one embodiment.

FIGS. 5A-5C illustrate various components of a bill validator assembly 500, in accordance with at least one embodiment. FIG. 5A is an isometric view of a mount cage assembly 502, FIG. 5B is an isometric view of a support bracket 504, and FIG. 5C is an isometric view of the support bracket 504 coupled to a bill validator 506. The mount cage assembly 502 includes a cam cage 508, a linear sliding cage 510 positioned inside the cam cage 508, and a swivel cage 512 positioned inside the linear sliding cage 510. In some examples, the mount cage assembly 502 additionally includes a door lock assembly 514. In at least one example, the swivel cage 512 includes the door lock assembly 514. In at least one example, the mount cage assembly 502 includes a handle 516. In the illustrated example, the cam cage assembly 508 includes two cam side plates 518 (although only one is visible in the illustrated view), and each cam side plate 518 defines a cam groove 520. In the illustrated example, the mount cage assembly 502 includes two swivels 522 (although only one is visible in the illustrated view). Each swivel 522 is coupled to a respective side of the swivel cage 512 and extends through a respective side of the linear sliding cage 510 and a respective cam groove 520 of the cam cage assembly 508, such that the swivels 522 allow the swivel cage 512 to swivel or rotate about the swivels 522 relative to the linear sliding cage 510 and the cam cage assembly 508. This swivel movement will be described in further detail with reference to FIGS. 7A-7D. Further, since the illustrated cam grooves 520 are curved, rotation of the cam cage assembly 508 causes the cam groves 520 to move and the swivels 522 to follow the cam grooves 520, such that rotation of the cam cage assembly 508 translates to linear movement of the linear sliding cage 510. This linear movement will be described in further detail with reference to FIGS. 6A-6E.

In some examples, the mount cage assembly 502 further includes a frame or housing 524 that may be coupled to the cam cage assembly 508 via pins or spindles 526 such that the cam cage assembly 508 can rotate about the pins 526 when the handle 516 is pulled or pushed. The frame or housing 524 can also accommodate installation of the bill validator assembly 500 within the cabinet 302 of the EGM, such that the frame or housing 524 can be coupled to or otherwise supported by the cabinet 302. In the illustrated example, the mount cage assembly 502 includes two gas springs 528 coupled to the cam cage assembly 508 such that the gas springs 528 affect movement of the cam cage assembly 508. For example, the gas springs 528 can provide resistance to control the force required to rotate the cam cage assembly 508 about its pins 526 and the speed at which the cam cage assembly 508 rotates about its pins 526. In some examples, the gas springs 528 can facilitate locking the cam cage assembly 508 in specific positions or otherwise maintaining the cam cage assembly 508 in a specific position until it is intentionally rotated into another position (i.e., the gas springs 528 will prevent gravity alone from rotating the cam cage assembly 508). In some examples, the gas springs 528 work with other locking mechanisms to facilitate locking the cam cage assembly 508 in a specific position. While the illustrated examples use gas springs 528, other examples may use mechanical springs, or other biasing elements.

The illustrated support bracket 504 includes a lower support 530, a rear support 532, and two arms 534. The lower support 530 and each arm 534 facilitates removably coupling the support bracket 506 to the bill validator 506. For example, in the illustrated embodiment, the lower support 530 and each arm 534 includes one or more apertures 536 for receiving a fastener to couple the bill validator 506 to the support 504. In the illustrated example, the support bracket 504 includes a lower coupling portion 538 at the lower support 530 and a rear coupling portion 540 at the rear support 532 for removably coupling the support bracket 504 to the swivel cage 512. In the illustrated example, the lower coupling portion 538 and the rear coupling portion 540 each include apertures for receiving a fastener to removably couple the support bracket 504 to the swivel cage 512 of the mount cage assembly 502. In other examples, the support bracket 504 may be of a different shape or arrangement so long as it facilitates the functions of the support bracket 504 as described.

The mount cage assembly 502 and the support bracket 504 form a bill validator mount 550, which when combined with the bill validator 506 and a cash box form the bill validator assembly 500. In some instances, the bill validator assembly 500 may only include the bill validator mount 550 and the bill validator 506, when the cash box has been removed or is otherwise not present. While the illustrated examples of the mount cage assembly 502 and the support bracket 504 include two of many components such that there is one on each side (e.g., two gas springs 528, two cam plates 520, two arms 536, etc., other example may include more or less of each component as long as the bill validator assembly 500 is able to function as intended. Further, other examples may include different coupling mechanisms, more or less coupling mechanisms, or coupling mechanisms in different locations, so long as the bill validator assembly 500 is able to function as intended.

FIGS. 6A-6E are isometric views of the bill validator assembly 500 illustrating movement of the bill validator 506 from a bill insertion position 600 to a collections position 602, in accordance with at least one embodiment. The bill validator assembly 500 includes the bill validator mount 550, the bill validator 506, and a cash box 604. In the bill insertion position 600 a portion of the bill validator 506 extends through the cabinet 302 of the EGM 300 (or is otherwise positioned to receive bills through the cabinet 302 of the EGM 300). For example, a face 606 of the bill validator 506 may be positioned at or near the player input interface 306 such that the player 312 can insert a bill into the face 606 of the bill validator 506. In the bill insertion position 600 the bill validator 506 has a first front edge position 608 and a first top edge position 610 which are marked to track movement of the bill validator 506. A bottom edge 612 of the frame 524 is marked throughout FIGS. 6A-6D to illustrate that the frame 524 does not move from the bill insertion position 600 to the collections position.

Figure 6A:
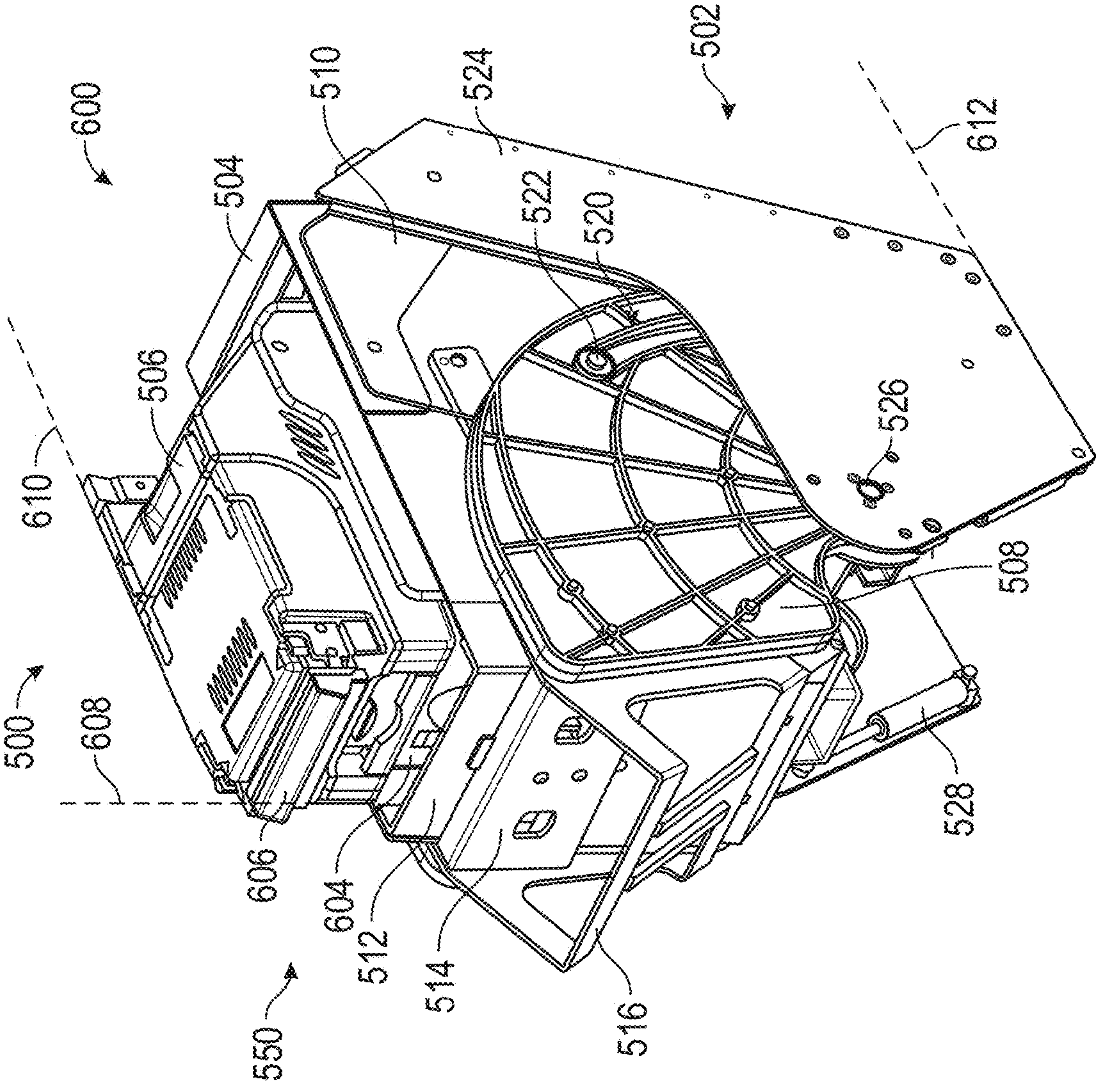
FIGS. 6A-6E are isometric views of a bill validator assembly illustrating movement of the bill validator from a bill insertion position to a collections position, in accordance with at least one embodiment.
Figure 6B:
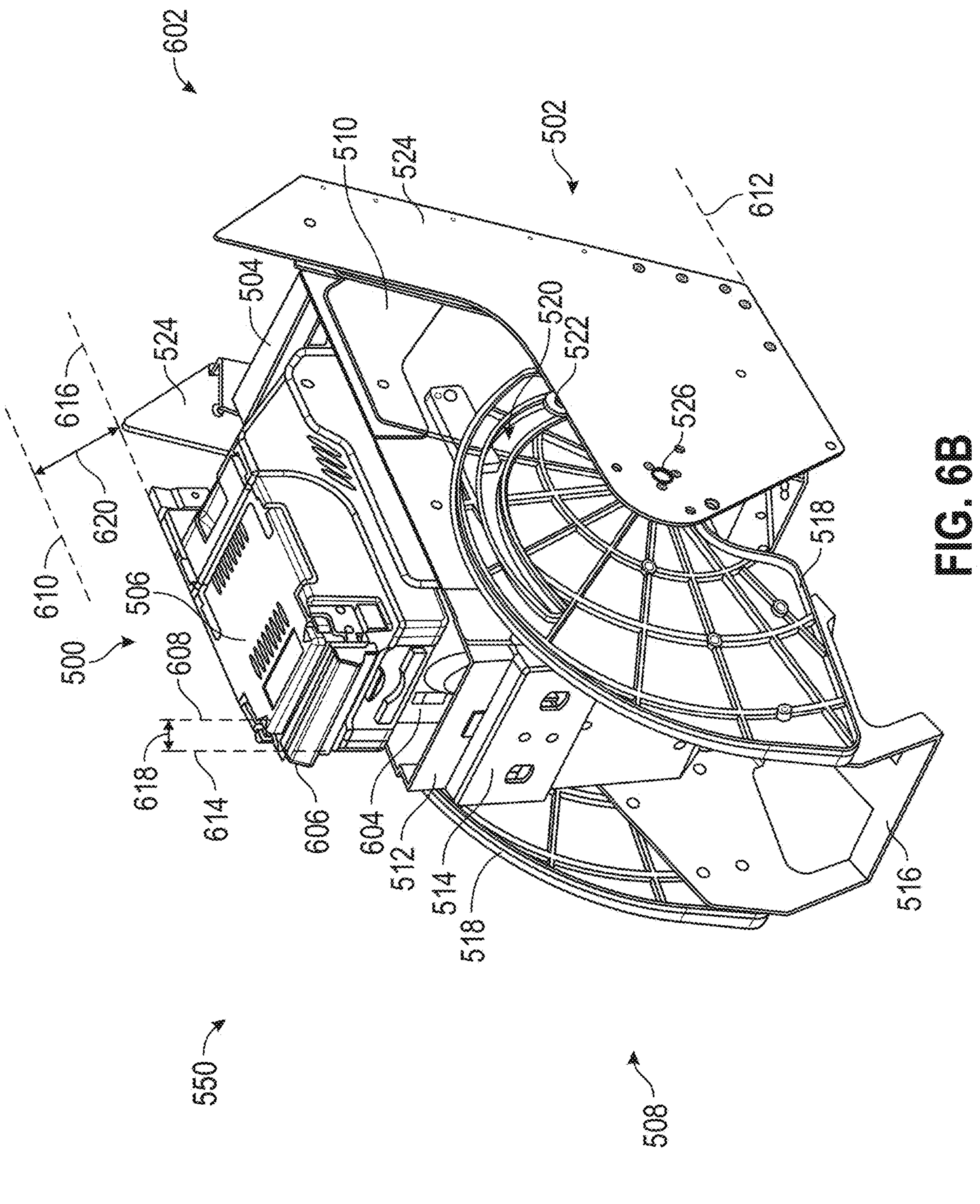
Figure 6C:
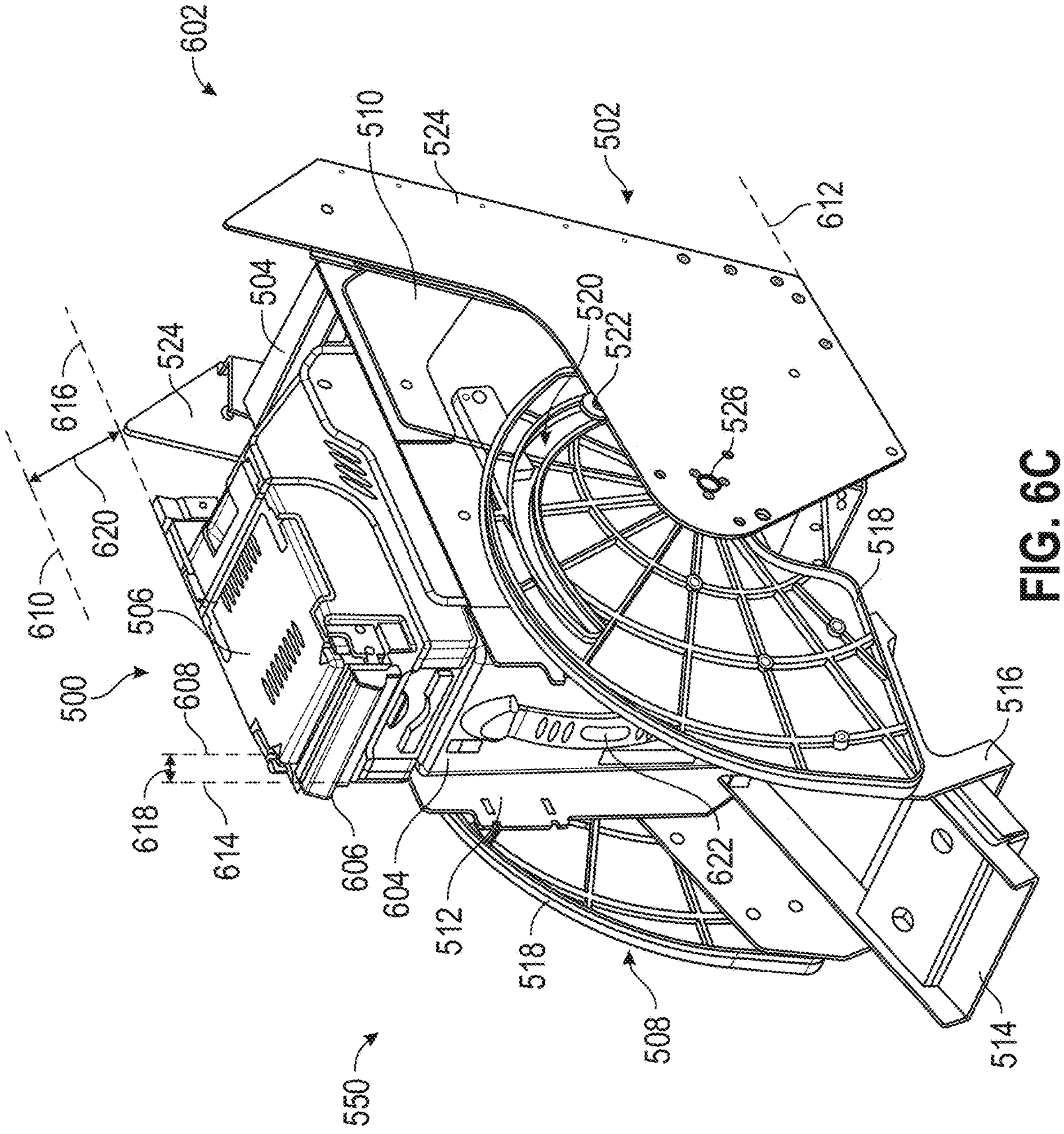

FIG. 6B illustrates the bill validator assembly 500 after the handle 516 has been pulled down to rotate the cam cage assembly 508 about pins 526, such that the swivels 522 follow the cam grooves 520 translating the rotational movement of the cam cage assembly 508 into linear movement of the linear sliding cage 510 into the collections position 602. The linear sliding cage 510 (and in turn the bill validator 506, the cash box 604, the swivel cage 512, and the support bracket 504) is lowered and moved forward relative to the bill insertion position when the bill validator assembly 500 is moved from the bill insertion position 600 to the collections position 602. During movement from the bill insertion position 600 to the collections position 602, the gas springs 528 help to control the speed of the bill validator 506 and the cash box 604 as it is lowered. As the handle 516 is pulled, each gas spring 528 is compressed until it rotates to the other side of its pivot axis, at which point the gas spring 528 will begin to extend upward and will lock the bill validator assembly 500 in the collections position 602 until a sufficient force is provided to overcome the resistance of the gas springs 528. In the collections position 602, the bill validator 506 has a second front edge position 614 and a second top edge position 616. The bill validator 506 moved a forward distance 618 from the first front edge position 608 in the bill insertion position 600 to the second front edge position 614 in the collections position 602. In at least one example, the bill validator 506 moves forward a distance 618 of approximately 32 millimeters. The bill validator 506 moved a lowering distance 620 from the first top edge position 610 in the bill insertion position 600 to the second top edge position 616 in the collections position 602. In at least one example, the bill validator 506 moves a lowering distance 620 of approximately 70 millimeters. In at least one example, the bill validator 506 moves at a seven-degree angle for an angular distance of approximately 77 millimeters from the bill insertion position 600 to the collections position 602. In various examples, the shape and dimensions of the cam groove 520 can differ to achieve different forward distances 618 and lowering distances 620 as appropriate to accommodate different cabinets of EGMs or other considerations.

Figure 6D:
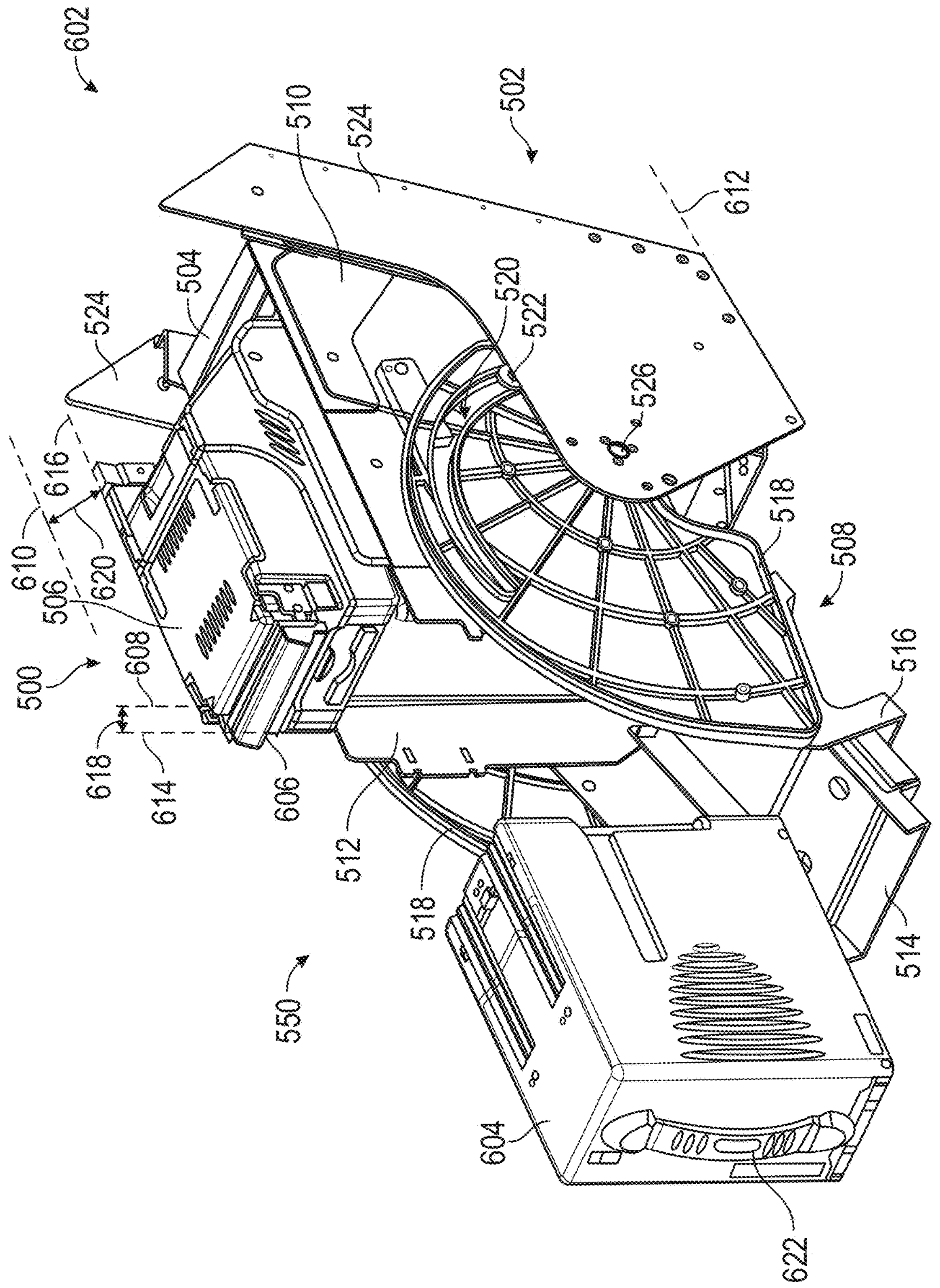

In the collections position 602, the handle 516 has been rotated out of the way to reveal or otherwise provide access to the door lock assembly 514. A credentialed operator having cash box credentials can then use the appropriate key(s) to unlock the door lock assembly 514. The door lock assembly 514 can include any of a variety of locks or other security measures to limit access to personnel with cash box credentials. In the example illustrated in FIG. 6C, the door lock assembly 514 is hinged at the bottom such that it pivots down to provide access to the cash box 604, however, other examples may employ different opening mechanisms, different mechanism locations, a combination of these, or the like. As shown in FIG. 6D, once the door lock assembly 514 has been opened, the cash box 604 can be accessed and removed. In the illustrated example, the cash box 604 includes a handle 622 that faces the door lock assembly 514, such that when the door lock assembly 514 is opened, the cash box 604 may be grabbed by its handle 622 and pulled out of the bill validator mount 550. In the illustrated example, when the cash box 604 has been removed from the bill validator mount 550, the lower coupling portion 538 of the support bracket 504 is accessible, such that fasteners may be removed from apertures 542 in the lower coupling portion 538. As such, the support bracket 504 (and therefore the bill validator 504) may only be uncoupled from the swivel cage 512 of the bill validator mount 550 with access to the cash box 604. That is, the bill validator 506 cannot be removed (to gain access to the cash box 604 or otherwise) without first having an operator with cash box credentials unlock the door lock assembly 508. This prevents a credentialed operator (or others) who gains access to the interior of the cabinet from being able to access the cash box. In at least one example, even if the support bracket 504 has been uncoupled from the swivel cage 512 at the lower coupling portion 538, the bill validator 506 cannot be removed if the cash box 604 is positioned in the bill validator assembly 500. In such examples, the cash box 604 will need to be removed from the bill validator assembly 500 while the bill validator mount is moved to the bill insertion position 600 and to the servicing position for removal of the bill validator 506 and support bracket 504.

Figure 6E:
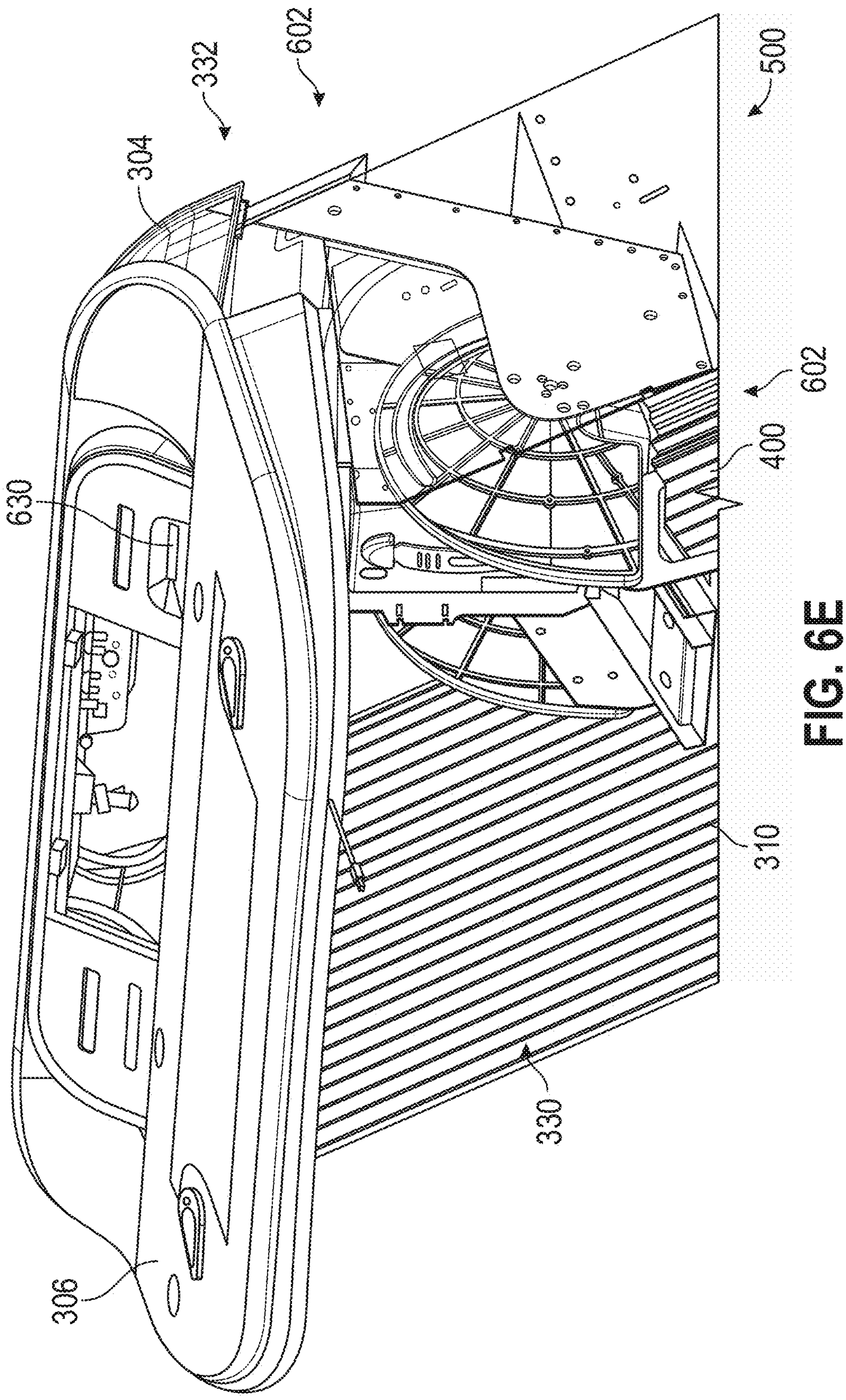

FIG. 6E illustrates the bill validator assembly 500 installed within a cabinet 302 (in the illustrated example, a pedestal cabinet). The bill validator assembly 500 is in the collections position 602, illustrating the clearance and ease of access to the cash box 604 as a result of the bill validator mount 550 moving the bill validator 506 and cash box 604 down and forward. In the illustrated example, a panel or a portion of a panel 400 of the front 330 of the base 310 of the cabinet 302 has been removed or opened to gain access to the handle 516 of the bill validator assembly 500 to move the bill validator assembly from the bill insertion position 600 to the collections position 602. In the bill insertion position 600, the face 606 of the bill validator 506 is accessible or visible through the opening 630 in the player input interface 306. However, as can be seen in the illustrated example, the face 606 has been lowered such that it cannot be seen, and the face 606 could not receive a bill inserted through the opening 630 of the player input interface 306 while in the collections position 602. In some examples, the bill validator mount 550 allows for convenient but secure collections without requiring lifting or otherwise opening of the player input interface 306. Once the collections operation is complete and the cash box 604 (which may be the same cash box or a different cash box) is returned to the bill validator assembly 500, the door lock assembly 510 is be lifted or otherwise closed to secure the cash box 604 in the bill validator assembly 500. In some examples the door lock assembly 510 automatically locks, while in other examples the operator locks the door lock assembly 510 before returning the bill validator assembly 500 to the bill insertion position 600. The handle 516 can be lifted or otherwise pushed with sufficient force to overcome the locking bias of the gas springs 528 to return the bill validator assembly 500 to the bill insertion position 600, at which point the gas springs 528 will continue pushing upward to lock the bill validator assembly 500 in the bill insertion position 600 until a sufficient force is applied to pull the handle 516 down again.

Figure 6F:
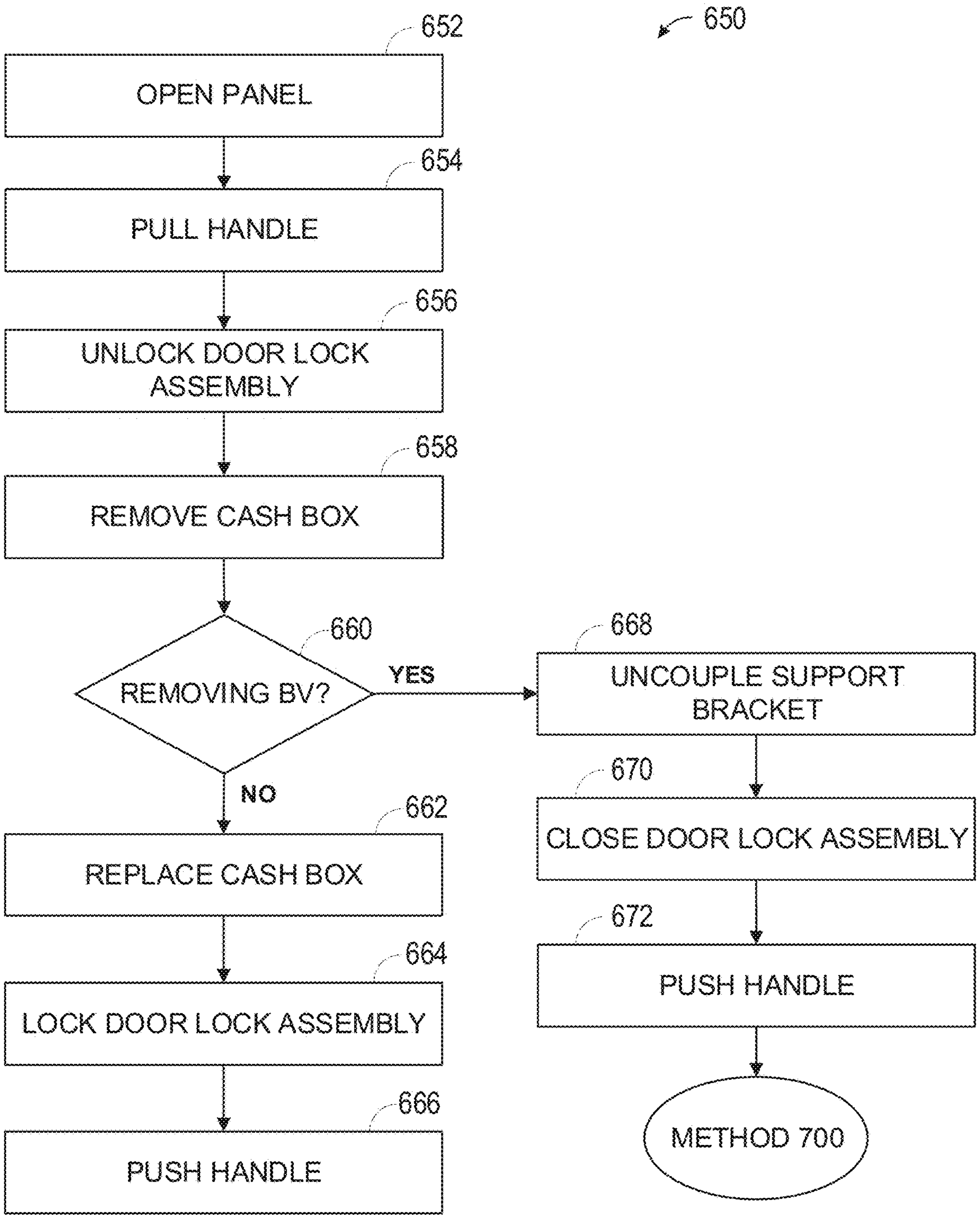
FIG. 6F is a flow chart of an example method of accessing the cash box for a cash drop, in accordance with at least one embodiment

FIG. 6F is a flow chart of an example method 650 of accessing the cash box 604 for collections (i.e., a cash drop), which has been described in greater detail above with reference to FIGS. 6A-6E (and below with reference to FIGS. 7A-7D with regard to removal of the bill validator 506). At block 652, an operator such as casino personnel, a technician, or the like, opens panel door 400 of the EGM. At block 654, the operator pulls the handle 516 to lower the cash box 604 and bring it forward from the bill insertion position 600 to the collections position 602. At block 656 the operator unlocks the door lock assembly 514 to reveal the cash box 604. At block 658 the operator removes the cash box 658 to remove some or all of the contents. At decision block 660 the method 650 proceeds depending on whether the cash box 604 is being moved for a cash drop or for removal of the bill validator 506.

If the cash box 604 was being removed for a cash box or reason other than removing the bill validator 506, then the method 650 proceeds to block 662 at which point the operator replaces the cash box 604 (either the same cash box or a new cash box). At block 664, the operator locks the door lock assembly 514. At block 666, the operator pushes the handle 516 to move the cash box 604 and the bill validator 506 up and backward from the collections position 602 to the bill insertion position 600.

Figure 7A:
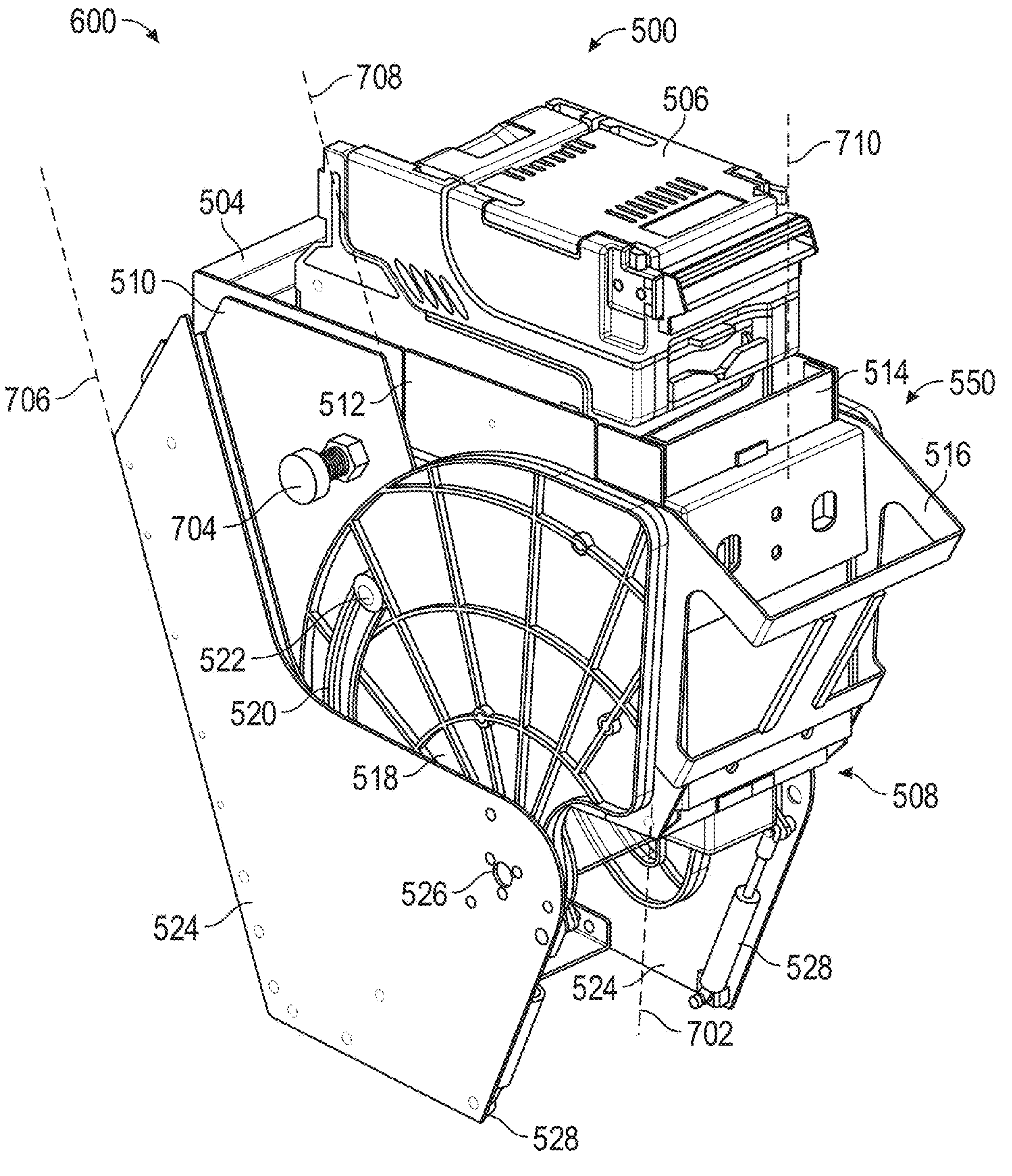
FIGS. 7A-7D are isometric views of a bill validator assembly illustrating movement of the bill validator from the bill insertion position to a servicing position, in accordance with at least one embodiment.
Figure 7B:
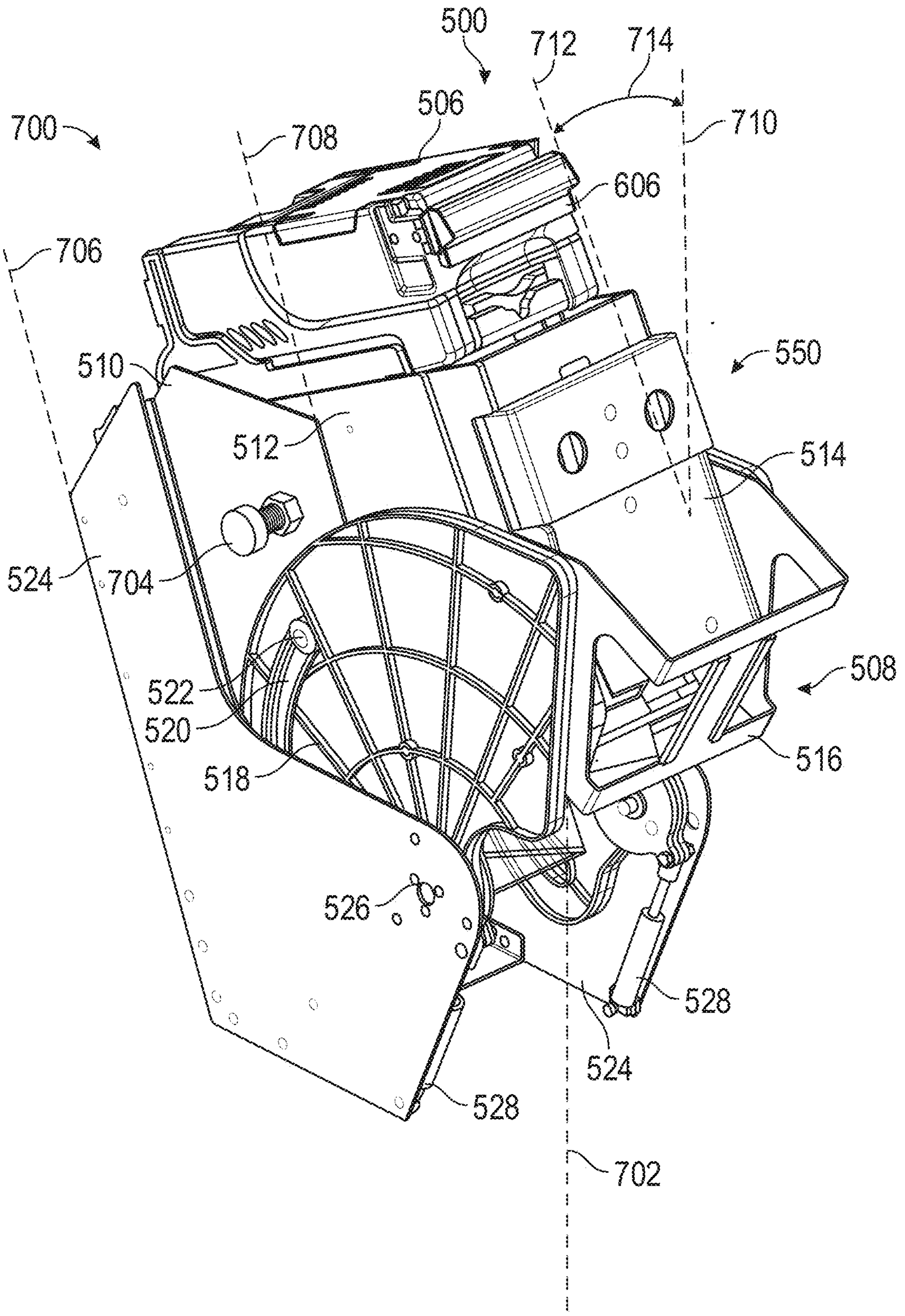

If the operator is removing the bill validator 506, then at decision block 660, the method 650 proceeds to block 668 at which point the operator uncouples the support bracket 504 from the swivel cage 512 at the lower coupling portion 538 while the bill validator assembly 500 is in the collections position 602. At block 670, the operator then closes the door lock assembly 514 without returning the cash box 604. At block 672, the operator pushes the handle to return the bill validator assembly 500 to the bill insertion position 600 from the collections position 602. To remove the bill validator 506, the operator then proceeds to block 752 of method 700 (FIG. 7E).

FIGS. 7A-7D are isometric views of the bill validator assembly 500 illustrating movement of the bill validator 506 from the bill insertion position 600 to a servicing position 700, in accordance with at least one embodiment. The bill validator mount 550 includes a locking mechanism such as at least one pull-pin 704 that extends through a first aperture of the swivel cage 512 to prevent the swivel cage 512 from swiveling relative to the linear sliding cage 510, the cam cage assembly 508, or the frame 524 in a first locked position. Generally speaking, the pull-pin 704 will be in the first locked position when the bill validator assembly is in (or moving between) the bill insertion position 600 and the collections position 602. To move the bill validator assembly 500 from the bill insertion position 600 to the servicing position 700, an operator can pull the pull-pin 704 such that it does not extend through the first aperture of the swivel cage 512. In examples with a locking mechanism other than a pull-pin 704, the operator can disable the locking mechanism to allow the swivel cage 512 to swivel relative to the linear sliding cage 510, the cam cage assembly 508, or the frame 524. With the pull-pin 704 removed from the first aperture of the swivel cage 512, the operator can release the pull-pin 704 and pull or otherwise tilt the head of the bill validator 506 backward, such that it rotates about swivels 522 until the pull-pin 704 engages a second aperture of the swivel cage 512 to prevent the swivel cage 512 from swiveling relative to the linear sliding cage 510, the cam cage assembly 508, or the frame 524 in a second locked position corresponding to the servicing position 700.

When the bill validator assembly 500 moves from the bill insertion position 600 to the servicing position 700, the linear sliding cage 510, the cam cage assembly 508, and the frame 524 do not move as a result of swivels 522, which couple the swivel cage 512 to the linear sliding cage 510 and the cam cage assembly 508, but allow the swivel cage 512 to rotate independently of the linear sliding cage 510 and the cam cage assembly 508. As a result, a cam plate edge position 702, a frame edge position 706 and a sliding cage edge position 708 marked in FIGS. 7A-7C do not change position. A first edge position 710 of the bill validator 506 is marked to show the movement of the bill validator 506 as it is tilted backward from the bill insertion position 600 to the servicing position 700. As can be seen in FIG. 7B, the bill validator assembly 500 is in the servicing position 700, the pull-pin 704 extends through the second aperture of the swivel cage 512 to lock the swivel cage 512 in the second locked position, and the bill validator 506 has tilted backward such that a second edge position 712 is at an angle 714 relative to the first edge position 710. In at least one example, the bill validator 506 tilts backward 45 degrees between the bill insertion position 600 and the servicing position 700. In some examples, the bill validator assembly 500 may include additional apertures such that the pull-pin 704 may lock the bill validator 506 at multiple positions. In at least one example, the bill validator assembly 500 includes an additional aperture such that the pull-pin 704 may lock the bill validator 506 in a bill validator removal position that is different than the servicing position 700. In at least one example, the bill validator 506 tilts 22 degrees backward from the bill insertion position 600 to the bill validator removal position, and the pull-pin 704 locks the bill validator 506 in the removal position.

Figure 7C:
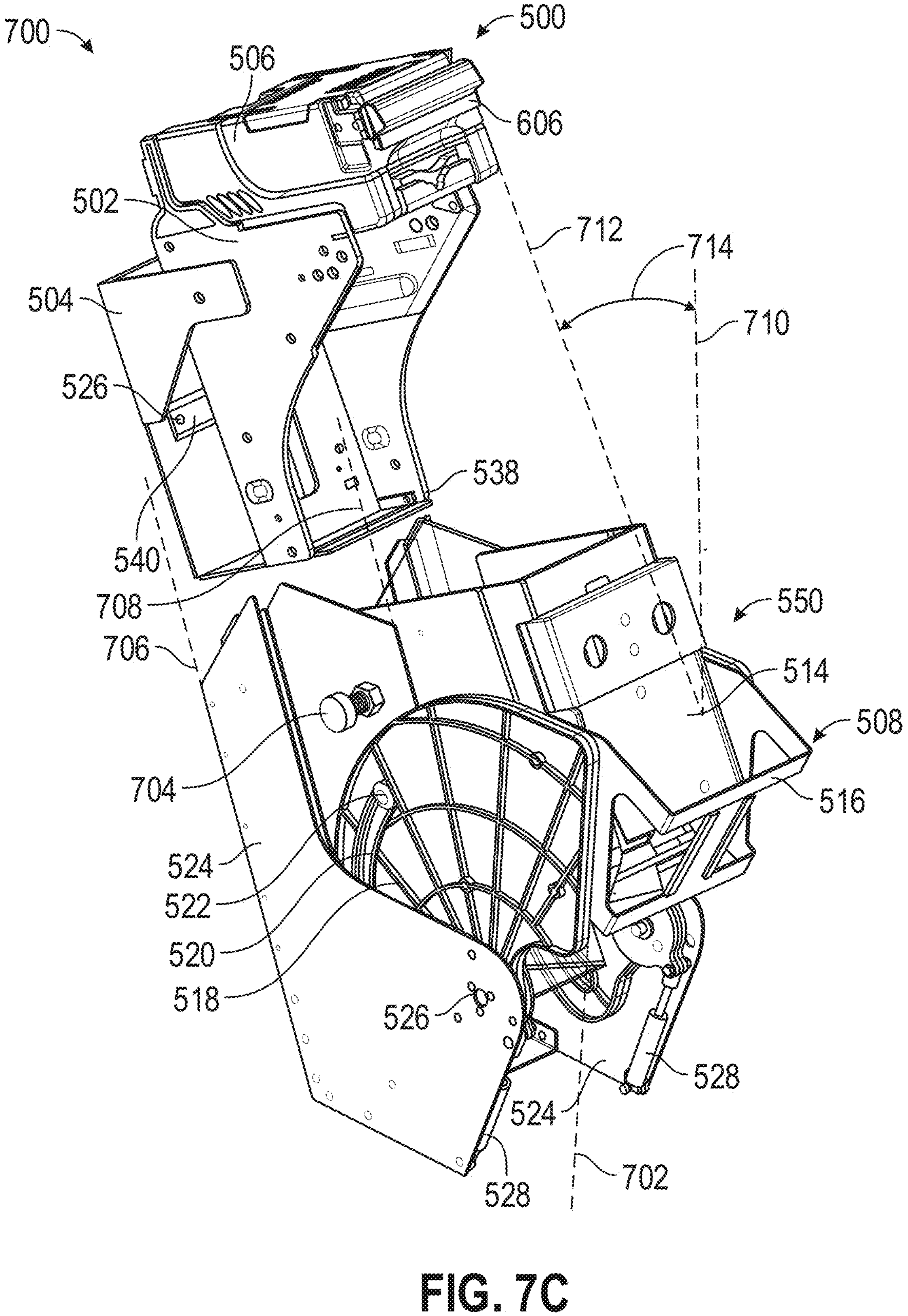

FIG. 7C illustrates that an operator may remove the support bracket 504 and the bill validator 506 from the swivel cage 512 in the servicing position 700. As discussed above, the support bracket 504 must first be uncoupled from the swivel cage 512 at the lower coupling portion 538 by removing the cash box 604 with the bill validator assembly 500 in the collections position 602. Then, the cash with box 604 removed and the lower coupling portion 538 uncoupled, the operator may move the bill validator assembly 500 to the bill insertion position 600 and then to the servicing position 700 to access the upper coupling portion 540. The operator may then uncouple the support bracket 504 from the swivel cage 512 at the upper coupling portion 540 and remove the support bracket 504 and the bill validator 506 (without the cash box 604 since it was removed) from the swivel cage 512 of the mount cage assembly 502. In at least one example, the operator may access the upper coupling portion 540 when the bill validator assembly 500 is in the bill insertion position 600. As a result, the servicing position 700 maintains security of the cash box 604 since it does not allow access to the cash box 604. That is, in the servicing position 700 the cash box 604 is not accessible unless the bill validator 506 is removed, and the bill validator 506 cannot be removed without first accessing the cash box 604 through the door lock assembly 514 in the collections position 602.

Figure 7D:
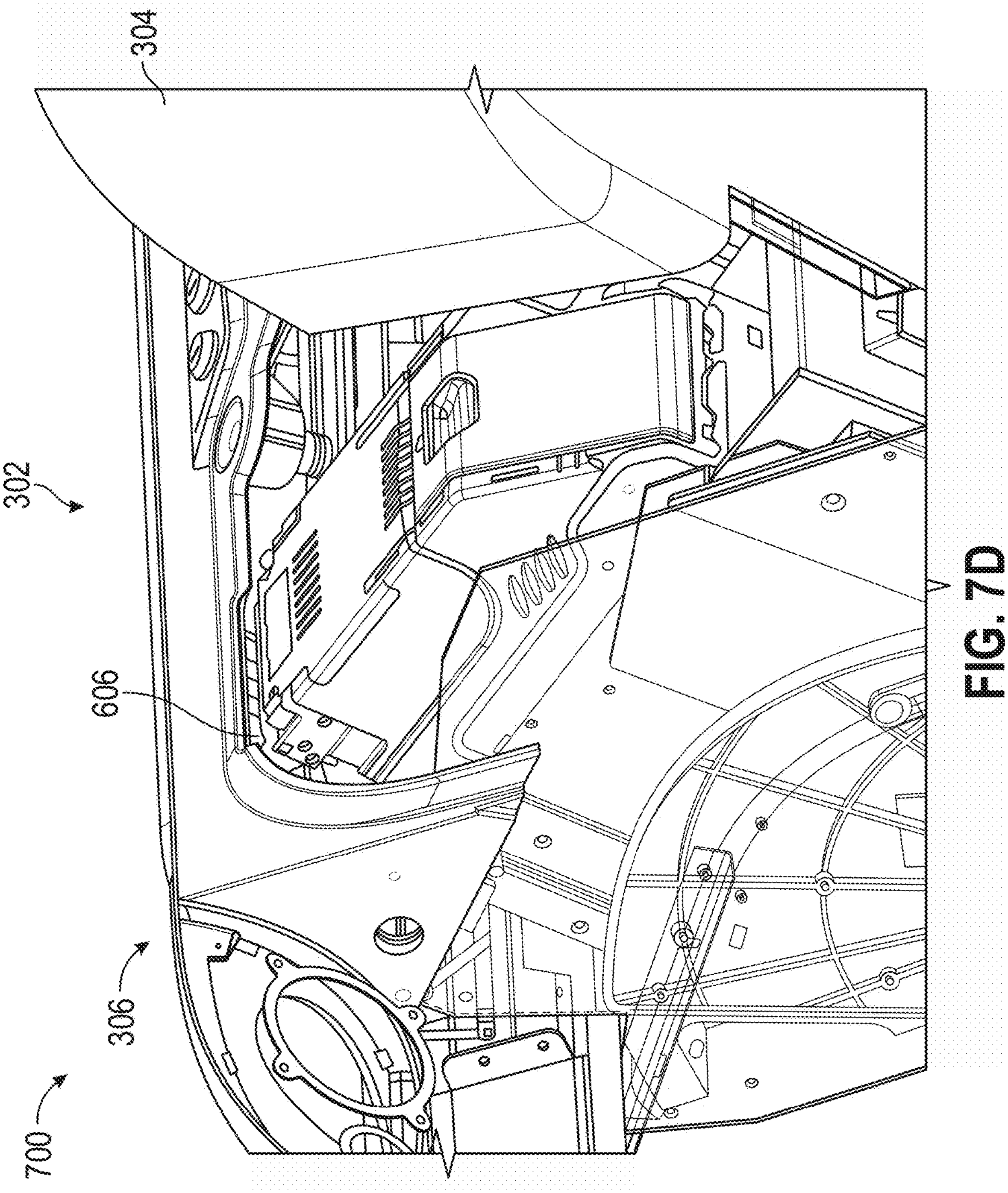
Figure 7E:
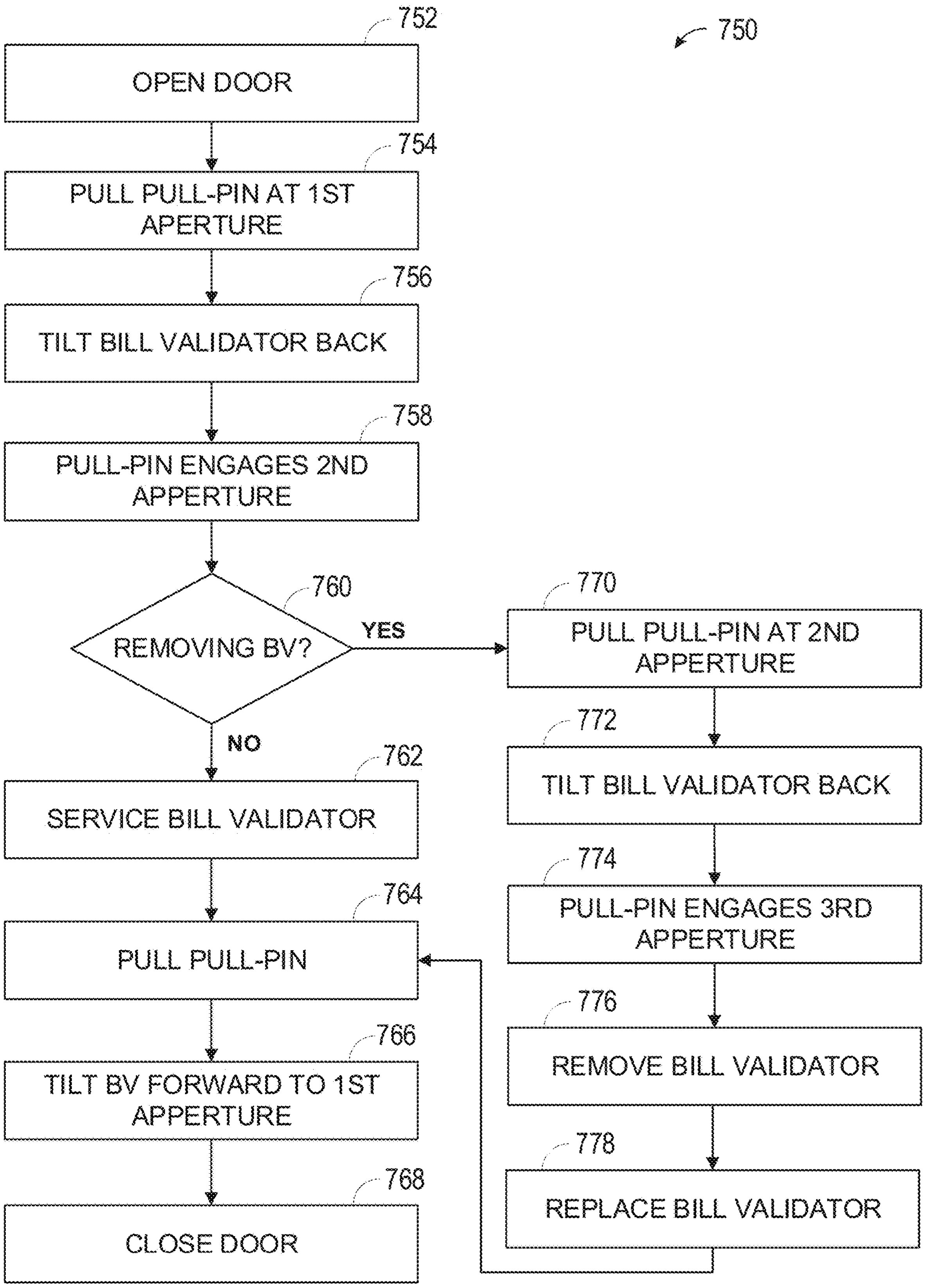
FIG. 7E is a flow chart of an example method of accessing the bill validator for servicing, in accordance with at least one embodiment.

FIG. 7D illustrates the bill validator assembly 500 installed within a cabinet 302 (in the illustrated example, a pedestal cabinet). The bill validator assembly is in the servicing position 700, illustrating the clearance and case of access to the head of the bill validator 506 for servicing the bill validator 506, for example clearing a paper jam. In the illustrated example, an operator has gained access to the bill validator via the access door 304 positioned at a rear side 332 of the cabinet 302. In the illustrated example, the cash box 604 is not visible, let alone accessible from the servicing position 700. In the illustrated example the pull-pin 704 is located on a right side of the bill validator assembly 500 since that is the more accessible option given the location of the bill validator assembly in the illustrated example cabinet 302, however the pull-pin 704 or other locking mechanism may be positioned differently in other examples so long as it is accessible from a rear access point, such as access door 304. To return the bill validator assembly 500 from the servicing position 700 to the bill insertion position 600, the operator pulls the pull-pin 704 to disengage the second aperture of the swivel cage 512 and pushes or otherwise rotates the head of the bill validator 506 forward about the swivels 522 until the pull-pin 704 engages the first aperture to lock the swivel cage 512 relative to the linear sliding cage 510, the cam cage assembly 508, and the frame 524 in the first locked position corresponding to the bill insertion position 600.

FIG. 7E is a flow chart of an example method 750 of accessing the bill validator 506 for servicing, which has been described in greater detail above with reference to FIGS. 7A-7D. At block 752, an operator such as casino personnel, a technician, or the like, opens the access door 304 to reveal the swivel cage 512 and at least one pull-pin 704 engaging a first aperture to lock the swivel cage 512 in a position for the bill insertion position 600 and collections position 602. At block 754, the operator pulls the pull pin 704 to disengage the first aperture. At block 756 the operator tilts the bill validator 506 backward until at block 758 the pull-pin engages the second aperture to lock the bill validator 506 in the servicing position 700. The method 750 proceeds depending on whether the operator is removing the bill validator 506 at this time. If the operator is not removing the bill validator 506 at this time, then the method 750 proceeds to block 762 such that the operator can service the bill validator 506 to remove a paper jam, etc. After the operator is finished servicing the bill validator 506, at block 764, the operator pulls the pull-pin 704 to disengage the second aperture. At block 766, the operator tilts the bill validator 506 forward from the servicing position 700 until the pull-pin 704 engages the first aperture and locks the bill validator 506 in the bill insertion position 600. At block 768, the operator closes the access door 304.

If the operator is removing the bill validator 506 rather than servicing the bill validator 506 then the operator would have needed to complete method 650 for removing the cash box 604 and uncoupling the support bracket 504 from the swivel cage 512 at block 668, etc. Then at decision block 760 of method 750, the method 750 would proceed to block 770 at which point the operator pulls the pull-pin 704 to release the second aperture. At block 772, the operator tilts the bill validator backward again until at block 774 the pull-pin engages a third aperture to lock the bill validator 506 in a removal position. In at least one example, the operator could pull the pull-pin 704 at block 754 and hold the pull-pin as the operator tilts the bill validator 506 backward such that it never engages the second aperture at block 758 and engages the third aperture after disengaging the first aperture, without ever engaging the second aperture. In at least one example the servicing position 700 is the same as the removal position, such that there is no third aperture, and the second aperture facilitates removal. At block 776, the operator removes the bill validator 506 coupled to the support bracket 504 from the swivel cage 512. In some examples, at block 778 the operator replaces the bill validator 506 (either the same bill validator after servicing or fixing, or in some examples a new bill validator which might be coupled to the same support bracket 504 or a new support bracket). The method 750 then proceeds to block 764 at which point the operator pulls the pull-pin 704 to disengage the aperture locking the bill validator 506 in the removal position (which may be the second aperture or the third aperture depending on the embodiment). At block 766 the operator tilts the bill validator 506 forward until the pull-pin 704 engages the first aperture to lock the bill validator 506 in the bill insertion position 600. Finally, at block 768 the operator closes the access door 304.

Other non-limiting example configurations are described in the following individually numbered Examples.

Example 1 is a bill validator mount, comprising: a support bracket configured to be coupled to a bill validator; and a mount cage assembly configured to receive the support bracket, the bill validator, and a cash box; wherein the mount cage assembly is configured to hold the bill validator in a bill insertion position relative to an electronic gaming machine (EGM), such that the bill validator is configured to receive a bill from a player in the bill insertion position, and wherein the mount cage assembly is configured to tilt the bill validator backward from the bill insertion position to a servicing position that allows access to the bill validator for servicing.

In Example 2, the subject matter of Example 1 optionally includes that the mount cage assembly is configured to lower the bill validator from the bill insertion position to a collections position to allow for removal of the cash box.

In Example 3, the subject matter of Example 2 optionally includes that the mount cage assembly is configured to move the bill validator forward from the bill insertion position to the collections position.

In Example 4, the subject matter of any one or more of Examples 2-3 optionally include that the mount cage assembly includes a door lock assembly configured to secure the cash box, such that the cash box can only be removed when the door lock assembly is unlocked.

In Example 5, the subject matter of Example 4 optionally includes that the support bracket is configured to be removably coupled to the mount cage assembly, such that the bill validator can only be removed after the door lock assembly has been unlocked.

In Example 6, the subject matter of any one or more of Examples 4-5 optionally include that the mount cage assembly further includes: a cam cage defining at least two cam grooves; a linear sliding cage positioned inside the cam cage; a swivel cage positioned inside the linear sliding cage; and at least two swivels coupled to the swivel cage and extending through the linear sliding cage and the cam cage such that: each swivel extends through a cam groove of the at least two cam groves, the swivel cage is configured to swivel relative to the linear sliding cage and the cam cage to pivot the bill validator from the bill insertion position to the servicing position, and the swivel is configured to follow the cam grooves to move the linear sliding cage and the swivel cage linearly from the bill insertion position to the collections position responsive to rotation of the cam cage.

In Example 7, the subject matter of Example 6 optionally includes that the mount cage assembly further includes a handle, such that pulling the handle causes rotation of the cam cage.

In Example 8, the subject matter of any one or more of Examples 6-7 optionally include two or more gas springs coupled to the cam cage assembly and configured to affect movement of the cam cage assembly.

In Example 9, the subject matter of Example 8 optionally includes that the two or more gas springs are configured to control: the speed of the bill validator as it moves from the bill insertion position to the collections position; and the force required to move the bill validator from the collections position to the bill insertion position.

In Example 10, the subject matter of any one or more of Examples 8-9 optionally include that the two or more gas springs are configured to: when the bill validator is in the bill insertion position, bias the bill validator to remain in the bill insertion position; and when the bill validator is in the collections position, bias the bill validator to remain in the collections position.

Example 11 is an electronic gaming machine (EGM), comprising: a cabinet; a player input interface positioned on the cabinet; and a bill validator assembly positioned in the cabinet, the bill validator assembly including: a bill validator configured to receive a bill from a player; a cash box configured to store the bill; and a bill validator mount holding the bill validator and the cash box, the bill validator mount comprising: a support bracket coupled to the bill validator; and a mount cage assembly coupled to the support bracket and configured to position the bill validator to receive the bill from the player in a bill insertion position, wherein the mount cage assembly is configured to facilitate movement of the bill validator in a first direction from the bill insertion position to a servicing position, wherein the mount cage assembly is configured to facilitate movement of the bill validator in a second direction from the bill insertion position to a collections position, wherein the first direction is different than the second direction.

In Example 12, the subject matter of Example 11 optionally includes that the first direction is toward a back of the cabinet and the second direction is toward a front of the cabinet.

In Example 13, the subject matter of any one or more of Examples 11-12 optionally include that: the servicing position is tilted backward relative to the bill insertion position; and the collections position is lowered relative to the bill insertion position.

In Example 14, the subject matter of any one or more of Examples 11-13 optionally include that the cabinet is a pedestal cabinet.

In Example 15, the subject matter of any one or more of Examples 13-14 optionally include that: the servicing position allows the bill validator to be serviced without opening the player input interface; and the collections position allows the cash box to be removed without opening the player input interface.

Example 16 is a method, comprising: providing or obtaining a bill validator mount positioned in an electronic gaming machine (EGM), such that a bill validator coupled to the bill validator mount is in a bill insertion position for receiving a bill from a player and a cash box is house by the bill validator mount within a cabinet of the EGM; accessing a handle associated with a cam cage assembly of the bill validator mount from a front side of the cabinet; pulling the handle to move the bill validator from the bill insertion position to a collections position to provide access to a door lock assembly securing the cash box; accessing the bill validator from a back side of the cabinet; and pulling a head of the bill validator toward a back of the cabinet to move the bill validator from the bill insertion position to a servicing position.

In Example 17, the subject matter of Example 16 optionally includes pulling out a pull pin to unlock rotational movement of the bill validator prior to moving the bill validator to the servicing position.

In Example 18, the subject matter of any one or more of Examples 16-17 optionally include unlocking the door lock assembly to reveal the cash box when the bill validator is in the collections position; and removing the cash box from the bill validator mount.

In Example 19, the subject matter of Example 18 optionally includes removably coupling the bill validator to a support bracket of the bill validator mount; inserting the support bracket into a mount cage assembly of the bill validator mount; and removably coupling the support bracket to the mount cage assembly.

In Example 20, the subject matter of Example 19 optionally includes uncoupling the support bracket from the mount cage assembly at a coupling portion only accessible when the bill validator is in the collections position; and then from the servicing position, removing the uncoupled support bracket with the bill validator from the mount cage assembly.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A bill validator mount for use with an electronic gaming machine, comprising:

an interface;

a bill validator being visible through the interface when the bill validator is at a bill insertion position, and being releasably mounted in a support bracket;

a cash box operable to be coupled to the bill validator to receive a bill from the bill validator in the bill insertion position; and a cage assembly releasably receiving the support bracket with the cash box being mounted to the cage assembly via the support bracket, the bill validator being movable between the bill insertion position relative to the interface, and a servicing position away from the bill insertion position, the cage assembly being operable to tilt the bill validator relative to the interface to the servicing position, thereby allowing access only to the bill validator for servicing while preventing access to the cash box, and to a collections position allowing access to both the cash box and the bill validator.

2. The bill validator mount of claim 1, wherein the cage assembly is operable to lower the bill validator from the bill insertion position relative to the interface to the collections position to allow for removal of the cash box.

3. The bill validator mount of claim 1, wherein the cage assembly is operable to move the bill validator forward from the bill insertion position relative to the interface to the collections position.

4. The bill validator mount of claim 1, wherein the cage assembly includes a door lock assembly configured to secure the cash box, such that the cash box is removable when the door lock assembly is unlocked.

5. The bill validator mount of claim 4, wherein the support bracket is configured to be removably coupled to the cage assembly, such that the bill validator is only removed after the door lock assembly has been unlocked.

6. The bill validator mount of claim 4, wherein the cage assembly further includes:

a cam cage defining a plurality of cam grooves;

a linear sliding cage positioned inside the cage assembly;

a swivel cage positioned inside the linear sliding cage; and at least two swivels coupled to the swivel cage and extending through the linear sliding cage and the cage assembly such that:

each swivel extends through a first cam groove of the plurality of cam grooves, the swivel cage is configured to swivel relative to the linear sliding cage and the cage assembly to pivot the bill validator from the bill insertion position to the servicing position, and the swivel is configured to follow the plurality of cam grooves to move the linear sliding cage and the swivel cage linearly from the bill insertion position to the collections position responsive to rotation of the cage assembly.

7. The bill validator mount of claim 6, wherein the cage assembly further includes a handle, such that pulling the handle causes rotation of the cage assembly.

8. An electronic gaming machine comprising:

a cabinet having a face;

a bill validator being visible on the face when the bill validator is at a bill insertion position, and being releasably mounted in a support bracket;

a cash box operable to be coupled to the bill validator to receive a bill from the bill validator in the bill insertion position, and to store the bill; and a cage assembly releasably receiving the support bracket with the cash box being mounted to the cage assembly via the support bracket, the bill validator being movable between the bill insertion position relative to the face, and a servicing position away from the bill insertion position, the cage assembly being operable to tilt the bill validator to a first position relative to the face to the servicing position allowing access only to the bill validator for servicing while preventing access to the cash box, and to a second position relative to the face to a collections position allowing access to both the cash box and the bill validator, and wherein the first position is different than the second position.

9. The electronic gaming machine of claim 8, wherein the first position is away from the face.

10. The electronic gaming machine of claim 8, wherein the bill validator in the servicing position is tilted backward relative to the bill insertion position, and the bill validator in the collections position is lowered relative to the bill insertion position.

11. The electronic gaming machine of claim 8, wherein the cabinet is a pedestal cabinet.

12. The electronic gaming machine of claim 11, wherein the servicing position allows the bill validator to be serviced without opening the face, and the collections position allows the cash box to be removed without opening the face.

13. The electronic gaming machine of claim 8, wherein the cage assembly further includes a handle, such that pulling the handle causes rotation of the cage assembly.

14. The electronic gaming machine of claim 8, wherein the cage assembly further includes a door lock assembly configured to secure the cash box, such that the cash box is removable when the door lock assembly is unlocked.

15. A method of servicing an electronic gaming machine having a cabinet having a face, a bill validator mounted in a support bracket and visible on the face when the bill validator is at a bill insertion position, a cash box operable to store a bill, and a cage assembly, the bill validator being movable between the bill insertion position relative to the face and a servicing position away from the bill insertion position, the method comprising:

positioning the bill validator with respect to the cash box to receive the bill in the bill insertion position;

releasably receiving the support bracket in the cage assembly;

mounting the cash box to the cage assembly via the support bracket;

tilting the bill validator in the cage assembly to the servicing position, thereby allowing access only to the bill validator for servicing while preventing access to the cash box; and tilting the bill validator in the cage assembly to a collections position, thereby allowing access both the cash box and the bill validator.

16. The method of claim 15, further comprising pulling out a pull pin to unlock rotational movement of the bill validator prior to moving the bill validator to the servicing position.

17. The method of claim 15, wherein the electronic gaming machine further includes a door lock assembly securing the cash box, further comprising:

unlocking the door lock assembly to reveal the cash box when the bill validator is in the collections position; and removing the cash box from the support bracket.

18. The method of claim 17, further comprising removably coupling the bill validator to the support bracket.

19. The method of claim 18, further comprising:

uncoupling the support bracket from the cage assembly at a coupling portion only accessible when the bill validator is in the collections position; and from the servicing position, removing the support bracket with the bill validator from the cage assembly.

20. The method of claim 15, further comprising allowing in the servicing position the bill validator to be serviced without opening the face, and in the collections position allowing the cash box to be removed without opening the face.

* * * * *